United States Patent

[11] 3,613,086

[72] Inventors Edward Loizides;
John R. Lyon, both of Poughkeepsie, N.Y.
[21] Appl. No. 788,876
[22] Filed Jan. 3, 1969
[45] Patented Oct. 12, 1971
[73] Assignee International Business Machines Corporation
Armonk, N.Y.

[54] COMPRESSED INDEX METHOD AND MEANS WITH SINGLE CONTROL FIELD

42 Claims, 24 Drawing Figs.

[52] U.S. Cl. .......... 340/172.5
[51] Int. Cl. .......... G06f 7/22
[50] Field of Search .......... 340/172.5; 235/157

[56] References Cited

UNITED STATES PATENTS

| | | | |
|---|---|---|---|
| 3,030,609 | 4/1962 | Albrecht | 340/172.5 |
| 3,242,470 | 3/1966 | Hagelbarger et al. | 340/172.5 |
| 3,275,989 | 9/1966 | Glaser et al. | 340/172.5 |
| 3,295,102 | 12/1966 | Neilson | 340/172.5 |
| 3,408,631 | 10/1968 | Evans et al. | 340/172.5 |
| 3,448,436 | 6/1969 | Machol, Jr. | 340/172.5 |

*Primary Examiner*—Raulfe B. Zache
*Assistant Examiner*—Mark Edward Nusbaum
*Attorneys*—Hanifin & Jancin and Bernard M. Goldman

ABSTRACT: Generating and searching a compressed key index (CK index) from a source index. The source index is a sorted sequence of uncompressed key's (UK's) in which a UK is a record key, as the term is ordinarily understood. The CK index comprises a plurality of compressed keys (CK's). Each CK is a shortened representation of a UK. After its generation, the CK index can be searched for any search argument (SA).

The format of a CK is generated by this invention to include a single control field (P), and at least one key (K) byte which is a byte taken from a UK. Each CK is generated from a pair of adjacent UK's taken in their sorted sequence from the source index. The pair of UK's are compared at corresponding byte positions from their highest-order bytes. The order of a byte position in a UK is determined by its significance in sorting the UK's. The control field (P) in the CK format is generated to represent the highest-order unequal byte position in the pair of compared UK's. Field (P) represents the lowest-order byte position in the CK. One key byte (K) is generated by copying a byte from the second UK in the pair at its byte location represented by the field (P). Additional key bytes are copied only when the current P (i.e. $P_i$) is greater than the prior generated P (i.e. $P_{(i1)}$), in which case K bytes are copied from the UK byte positions ($P_{(i1)}+1$) through ($P_i$). Also a pointer (i.e. address) is provided represented by the first UK in the pair from which the CK was generated.

The CK index can be searched for any search argument (SA). The search uses one byte (A) at a time from the SA beginning with its highest-order byte. The setting of an equal-counter (EQU) indicates the position of the current byte A in the SA.

While serially searching a CK index for the byte A, the control field (P) of each encountered CK is read. Then a factor value and the number of K bytes are derived for the current CK after determining if its $P_i$ is greater than $P_{(i1)}$. The factor value indicates the amount of high-order compression for the UK being represented. If $P_i$ is greater than $P_{i1}$, the prior control field ($P_{(i1)}$) is the current factor value, and the current number of key bytes (K) is $P_i$ less $P_{(i1)}$. But if $P_i$ is equal to or less than $P_{(i1)}$, the current factor value is $P_i$, and only one K byte exists in the current CK.

The current factor value is then compared to the current equal counter setting (EQU). If the factor value is greater than the search argument, the search continues by going to the next CK. But if they are equal, the highest-order K byte in the CK is compared with the current A byte. If A and K are equal, the next A byte and the next K byte (if any) are fetched, and they are compared. Whenever all K bytes in a CK compares equal with A bytes, or whenever any K byte is less than the A byte, the search passes to the next CK. Whenever any $P_i$ is less than the current setting of the equal counter (EQU), or whenever any K byte compares high with the A byte, the search is completed after reading the pointer with the current CK, retrieving the pointer's record, and comparing the SA to the UK in the record for verification that the correct record has been obtained. The search is then ended in an index having an ascending sequence.

INVENTORS
EDWARD LOIZIDES
JOHN R. LYON
BY Bernard M. Goldman
ATTORNEY

FIG. 6 GENERATION MODE CLOCK CONTROLS
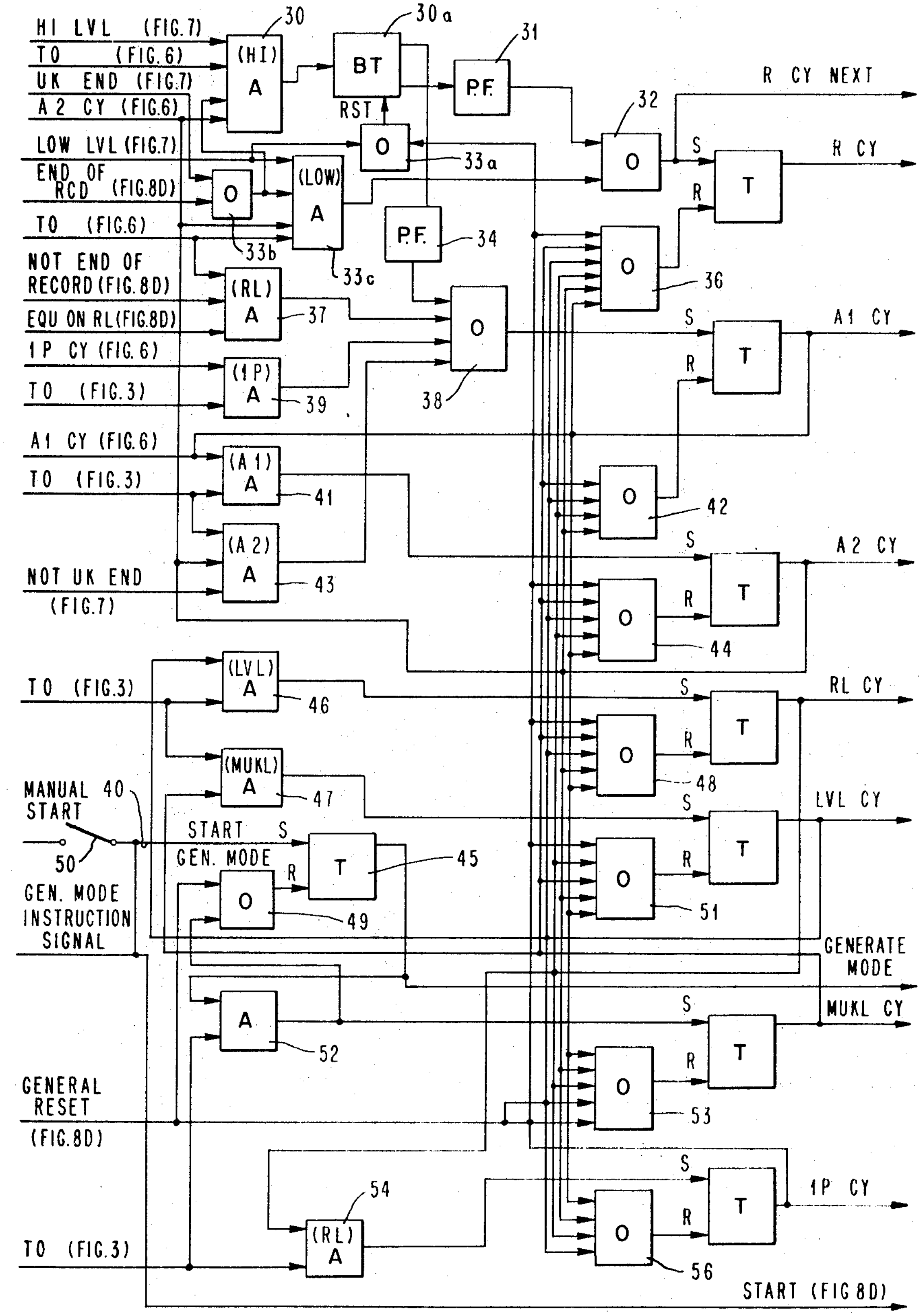

SEARCH MODE

COMPRESSED INDEX METHOD AND MEANS WITH SINGLE CONTROL FIELD

TABLE OF CONTENTS

| Application section: | Application pages |
|---|---|
| Abstract | 1 |
| Introduction | 2-8 |
| Drawing description | 9 |
| Generate mode method | 10-14 |
| Search mode method | 15-16 |
| Generate mode system | 17-39 |
| (1) General | 17-24 |
| (2) Specific | 24-28 |
| (3) General-output | 28-37 |
| Legend for Figure 8B | 30 |
| (4) Specific-output | 37-39 |
| Search mode system | 40-52 |
| (1) Search mode circuits | 40-48 |
| (2) Clock controls for search mode | 49-52 |

INTRODUCTION

This invention relates generally to information retrieval and particularly to a new electronically controlled technique for generating and searching machine-readable indexes. A basic method and means for machine-generation and machine-searching of compressed indexes are disclosed and claimed in U.S. Pat. applications Ser. Nos. 788,807 and 788,835 filed on the same date as the subject application, and owned by the same assignee.

Information of every sort is being generated at an ever increasing rate. It is becoming ever more apparent that a bottleneck sometimes exists in not being able to quickly retrieve an item of information from the mass of information in which it is buried. Although much work has been done on information retrieval, no overall solution has been found thus far, even through many sophisticated information retrieval techniques have been conceived for accessing of information involving large numbers of documents or records.

Within the information retrieval environment, the invention relates to a tool useful in controlling a machine to locate information indexed by keys. Any type of alpha-numeric keys arranged in sorted sequence can be converted into compressed-key form and searched by the subject invention. Each compressed key represents a boundary (either high or low) for the uncompressed key it represents. Each compressed key may have associated with it data, or the location of one or more items of information it represents. The location information may be an attached address, pointer, or it may be derivable from the key itself by means not part of this invention.

The subject invention is inclusive of an inventive algorithm which greatly improves the speed of searching a sorted index by searching a compressed form of the index rather than by searching the uncompressed index.

Many different methods and means for searching an uncompressed sorted index are known and have been disclosed in the past. Uncompressed index searching is being electronically performed with computer system, using special access methods, control means, and electronic cataloging techniques. U.S. Pat. Nos. 3,408,631 to J. R. Evans, 3,315,233 to R. De Camp et al.; and 3,366,928 to R. Rice et al.; 3,242,470 to Hagelbarger et al.; and 3,030,609 to Albrecht are examples of the state of the art.

Current computer information retrieval is limited in a number of ways, among which is the very large amount of storage required. The uncompressed key format results in having to scan a large number of bytes in every key entry while looking for a search argument. This is time consuming and costly when searching a large index, or when repeatedly searching a small index. It is this area which is attacked by the subject invention, which greatly reduces the number of scanned bytes per key entry in a searched index. A result obtained is smaller search-storage requirements and faster searching due to less bytes needing to be machine-sensed. A significant increase in searching speed results without changing the speed of a computer system.

Current electronic computer search techniques, such as in the above cited patents, have uncompressed keys accompanying records on a disc or drum for indexing the subject matter contained in an associated record. A search for the associated record may be done either by the key or by the address of the record. For example in U.S. Pat. Nos. 3,408,631; 3,350,693; 3,343,134; 3,344,402; 3,344,403 and 3,344,405 an uncompressed key can be indexed on a magnetically recorded disc. A key can be electronically scanned by a search argument for a compare-equal condition. Upon having a compare-equal condition, a pointer address associated with the respective uncompressed key is obtained and used to retrieve the record represented by the key which may be elsewhere on the disc. This pointer, for example, may include the location on the disc device, or on another device, where the record is recorded. The computer system can thereby automatically access the addressed record. After being located, the record may be used for any required purpose.

This invention pertains to generating and searching a compressed form of a sorted index. The compressed form removes a type of redundancy attributable to the sorted nature of the index, i.e. it removes a sorting induced type of redundancy.

The prior art on redundancy removal has not recognized the removal of sorting-induced redundancy. Examples of pertinent but nonrelated prior compression techniques are found in: U.S. Pat. Nos. 2,978,535 (E. F. Brown) and 3,225,333 (A. W. Vinal) on digitized TV signals; 3,185,824 (H. Blasbalg) and 3,237,170 (F. W. Ellersick, Jr.) on counting numbers of mismatches between successive frames of a digital communication signal; 3,237,170 (H. Blasbalg) for coding repetitious bit patterns; 3,275,989 (E. L. Glaser et al.) relates to commands which only contain that portion which is changed from the previous command; 3,233,982 (G. Sacerdoti et al.) relates to the use of the changed part of an address in relation to the prior address; 3,278,907 (H. J. Barry et al.) for time compressing Doppler radar signals, and application Ser. No. 406,462, now U.S. Pat. No. 3,490,690, filed Oct. 26, 1964 (D7759) by C. T. Apple et al. (assigned to the same assignee as the subject application) relates to a technique for reducing test data.

Many of the above patents pertain to data compression techniques which are intended to be reversible. That is, they compress the data, transmit it, and reconstruct the original uncompressed data from the received compressed data. Reversibility is not a requirement with the subject invention, because index compression has the primary objective of fast searchability with less storage.

It is therefore an object of this invention to provide a novel method and system which can generate index compressed by substantial removal of its sorting-redundancy.

It is another object of this invention to provide a novel method and system which can search a compressed index to reduce the number of bytes needed to be machine scanned during a search, when compared to a similar search through the corresponding uncompressed index. This greatly increases the machine search speed in relation to the speed of searching the sorted uncompressed source index at the same machine byte rate.

It is a further object of this invention to search a compressed index in which the size of each key entry is largely independent of the length of its corresponding uncompressed key. For example, an uncompressed key which is hundreds or thousands of bytes long might be represented as a compressed key having a single control field and a single key byte. The amount of index compression is primarily dependent on the "-tightness" of the index, that is the amount of variation in the sorted relationship among the uncompressed keys in the index.

DEFINITION TABLE

ARGUMENT BYTE:

Any single byte in the search argument which is currently being searched for in the compressed index. The position of the current ARGUMENT BYTE in the search argument is indicated by the current setting of the equal counter. It is sometimes referred to as ARG, or S.A. BYTE, or A BYTE.

BLOCK:

A collection of recorded information which is machine-accessible as a unit. A block is also called a RECORD. The meaning of block and record ordinarily found in the computer arts is applicable.

COMPRESSED BLOCK:

An index block comprising compressed index entries. It is also called a COMPRESS INDEX BLOCK.

COMPRESSED INDEX:

A collection of entries, each representing an item in an index in a shortened form, which can be searched with a search argument to find any item represented by an entry in the index.

COMPRESSED INDEX ENTRY:

An index entry having at least a compressed key and a related pointer.

COMPRESSED KEY:

A reduced representation of a specific item in an index which in most situations contains substantially fewer number of characters, or bits, than an original key it represents. It is generally referenced by its acronym CK. A CK is sometimes referred to by its recorded format, PK.

COMPRESSED KEY FORMAT:

The PK form of a compressed key represents the sequence of fields in a recorded compressed key. In this format, P is a control field, and K is a field having one or more key bytes. The COMPRESSED ENTRY FORMAT is PKR in which the R field contains a pointer which addresses the data item represented by the associated compressed key.

DATA BLOCK:

Data grouped into a single machine-accessible entity. A data block is also called a DATA LEVEL BLOCK.

DATA LEVEL:

The collection of data, which may be called a data base, which is retrievable through the compressed index. The data level comprises a plurality of data blocks.

EQUAL BYTE:

A byte in an uncompressed key comparing equal with a correspondingly positioned byte in the prior uncompressed key in sorted sequence, and having a higher-order than the highest-order unequal byte found while comparing the same uncompressed keys. The equal bytes are located to the left of the first unequal byte in the comparison of the pair of uncompressed keys.

EQUAL COUNTER:

A counter or register which indicates the current number of consecutive high-order bytes of the search argument found during the search of a compressed index. The equal counter setting is initialized before searching an index block to indicate the highest-order byte position in the search argument. The equal counter is incremented each time a selected K byte is equal to the current A byte. The abbreviation EQU CTR means equal counter.

FACTOR FIELD:

The number of high-order bytes missing from a compressed key. It is generated from the relationship between the position byte, $P_i$, of a compressed key and its prior position byte, $P_{i-1}$. The factor field for the current compressed key is $P_i$ if $P_i<P_{i-1}$; and the factor field is $P_{i-1}$ if $P_i \geq P_{i-1}$.

FIRST HIGH CK:

The first compressed key found during a sequential scan of the compressed index having the ending conditions for the search. The search ending is signaled by the first CK during the search to have a K byte greater than the argument byte when both bytes have the same byte position in relation to the search argument.

HIGH LEVEL:

A set of index block's having entries with pointers that address index block's in a lower index level; that is, the pointers in a high level do not address data blocks. Every index level, except the lowest level, is a high index level.

INDEX:

A recorded compilation of keys with associated pointers for locating information in a machine-readable file, data set, or data base. The keys and pointers are accessible to and readable by a computer system. The purpose of the index is to aid the retrieval of the required data blocks.

INDEX BLOCK:

A sequence of index entries which are grouped into a single machine accessible entity.

INDEX ENTRY:

An element of an index block having a pointer. The entry may contain a compressed or uncompressed key.

INDEX LEVEL:

A set of entries in an index or compressed index which have pointers which address another level of the index.

KEY:

A group of characters, or bits, usually forming a field in a data item, utilized in the identification or location of the item. The key may be part of a record or file, by which it is identified, controlled or sorted. The ordinary meaning in the computer arts is applicable.

KEY BYTE:

A selected character in a key or compressed key. It is called a K byte.

LOW LEVEL:

The set of index blocks which have entries with pointers that address data blocks. The lowest level of the index is also called the LOWEST LEVEL or LOW INDEX LEVEL.

POINTER:

An address within an index entry which locates the item represented by the entry.

SEARCH ARGUMENT:

A known reference word, or argument, used to search for a desired data item in a collection of data items, which may be called a data base. The desired data item is expected to have a key field identical to the search argument. The acronym SA means search argument. Each byte of the search argument is called an S.A. byte. For example, an employee's name may be an SA for searching for his record in a company file indexed by employee names.

SOURCE INDEX:

An index of uncompressed keys from which the subject invention generates an index of compressed keys.

SELECTED K BYTE:

A K byte which is obtained for comparison with a byte of the search argument. Those K bytes which are bypassed (or skipped) during the search of a compressed index are not selected K bytes.

UNCOMPRESSED INDEX:

An ordinary index or sequenced uncompressed key's.

UNCOMPRESSED KEY:

It has the ordinary meaning for KEY understood in the data processing arts. It is herein referred to by its acronym UK. (The reason for adding the description "uncompressed" in this specification is to distinguish the ordinary key from a reduced form, which is called herein by the term, compressed key.)

UNCOMPRESSED KEY PAIR:

A pair of adjacent uncompressed keys is a sorted sequence of keys which are compared in the process of generating a compressed key. It is also called a UK pair.

POSITION FIELD:

A field in a compressed key containing a value representing the position of its lowest-order K byte in relation to a search argument. The value is determined while generating the compressed keys by a comparison between an uncompressed key and its prior uncompressed key in a sorted sequence of keys. In the UK pair, it is the leftmost unequal byte, i.e. the first unequal byte after all consecutive high-order equal bytes found in the comparison of the UK pair. It is the rightmost K byte in the CK derived from the UK comparison. The position field is also called the POSITION BYTE or P BYTE.

SYMBOL TABLE

| | |
|---|---|
| ARG: | Argument byte. |
| CK: | Compressed key. A subscript on CK particularizes it. |
| $CK_i$: | The current CK being examined while searching a sequence of CK's. |
| CK's: | Plural for CK. |
| CT: | Count. |
| CY: | Cycle. |
| HI: | High. |
| $i$: | A subscript on an item which particularizes the item as being the current item being examined during the process. |
| $i-1$: | A subscript on an item which particularizes the item as having been examined during the prior processing iteration. |
| $i+1$: | A subscript on an item which particularizes the item to be examined during the next processing iteration. |
| K: | Key Byte field. (A subscript on K further particularizes it.) There are one or more K bytes in the K field of each compressed key. |
| $K_i$: | The acronym K with the subscript $i$. It means the key byte currently being examined while searching a sequence of compressed keys. |
| K–N: | Particular K with subscript N. |
| LVL: | Level in the index. It is a flag byte at the beginning of an index block indicating the level in the index for the keys in the block. |
| MUKL: | Maximum uncompressed key length. It is a flag byte at the beginning of a block of sequenced UK's which indicates the length of each uncompressed key. Any UK is padded on the right if it is shorter than this length, and it is truncated on the right if it is longer. |
| N: | A noise byte in an uncompressed key. It is each byte in an uncompressed key at a less significant byte position (i.e. lower-order byte position) than the unequal byte position. (Noise bytes are not needed for compressed index construction or searching). |
| P: | Position byte. (A subscript on P further particularizes it). It is a control field in a compressed key which relates its key byte(s) to byte positions in the search argument. It is derived while generating the CK from a UK pair by finding the highest-order unequal byte position in a comparison of the UK pair. P is also called the "difference byte," or the "leftmost unequal byte" in the UK pair. Byte position significance is presumed to decrease within a UK, or in the K bytes within a CK, in going from left to right as ordinarily understood for sorting purposes. |
| $P_i$: | The P byte currently being examined during the process of searching a sequence of compressed keys. |
| $P_{i-1}$: | The P byte examined immediately prior to $P_i$. |
| PK: | A recorded format for a compressed key having a P byte field followed by a K byte field. (A subscript on PK further particularizes it.) |
| PTR: | Abbreviation for pointer. |
| R: | Pointer field. It comprises one or more bytes representing a pointer, which is an address of a data block represented by the compressed key with which the pointer is associated. |
| RL: | Length in bytes of the pointer field. |
| R–1: | Particular N pointer with subscript 1. |
| UK: | Uncompressed key. (A subscript on UK further particularizes it.) |
| UK–N: | Particular UK with subscript N. |
| UK's: | Plural for UK. |

GENERAL STATEMENT OF INVENTION

The invention generates a compressed key format having a control field which represents the highest-order unequal byte position in the uncompressed key it represents. The highest-order unequal byte position is obtained by comparing the represented uncompressed key with its next following uncompressed key in their sorted sequence. The last uncompressed key of any pair becomes the first uncompressed key of the next pair in the sequence for generating the next compressed key.

The invention provides at least one key byte with every compressed key, which is its lowest-order key byte. This key byte is derived from an uncompressed key next following the represented uncompressed key. This key byte is the highest-order unequal byte in that next following uncompressed key at its location represented by the control field.

Some compressed keys will have more than the minimum single byte. This is determined by the relationship between the current control field ($P_i$) and its prior control field ($P_{i-1}$). If the current control field is equal to or less than the prior control field, only a single key (K) byte is provided in the current compressed key (CK). But if the current control field is greater than its prior control field, the current compressed key will have plural key bytes, with their number being equal to one plus the difference between these two control fields. Pointer addresses and data may be associated with the compressed keys by being positioned next to their respective keys.

When searching, the invention stores the control field ($P_{i-1}$) of the prior compressed key and compares it to the control field ($P_i$) of the current compressed key by subtracting the former from the latter ($P_i$–$P_{i-1}$). The difference determines the number of key bytes in the current compressed key. It will have one key byte if the difference is zero or negative. But it will have a plurality of key bytes equal to a positive difference plus one. The control field always defines the position of the lowest-order key byte in its compressed key. However, the key bytes are generally read from highest to lowest order. To determine the position of the first-read and highest-order byte in the current compressed key in relation to the uncompressed key it represents, both the prior and current control fields are needed. This highest-order key byte position is a factor value needed for determining the byte position in the search argument that the first (highest-order) key byte may be compared with. Any remaining key bytes in the compressed key will correspond to sequentially lower-order search argument bytes.

At the beginning of the search, an equal counter is initialized, for example by being set to one. Its setting is compared to the factor value calculated for each compressed key searched in sequence. The remainder of the search method can proceed as described and claimed in U.S. Pat. application Ser. No. 788,835, previously cited.

The foregoing and other objects, features and advantages of the invention will be apparent from the following more particular description of preferred embodiments of the invention, as illustrated in the accompanying drawings.

DRAWING DESCRIPTION

FIG. 1A illustrates an uncompressed index; and FIG. 1B illustrates a compressed index derived therefrom;

FIGS. 2A and B illustrate a buffer and input-output circuits used for storing an uncompressed index and a compressed index respectively;

FIG. 3 shows clocking and mode control arrangement;

FIG. 4A illustrates generation mode clock timing for the circuit in FIG. 6, and FIG. 4B shows search mode clock timing for the circuit in FIGS. 9A and B;

FIG. 5A illustrates a format for a low level compressed index block; while FIG. 5B illustrates a format for a high level compressed index block;

FIG. 6 represents generation mode clock controls;

Figure 9A:
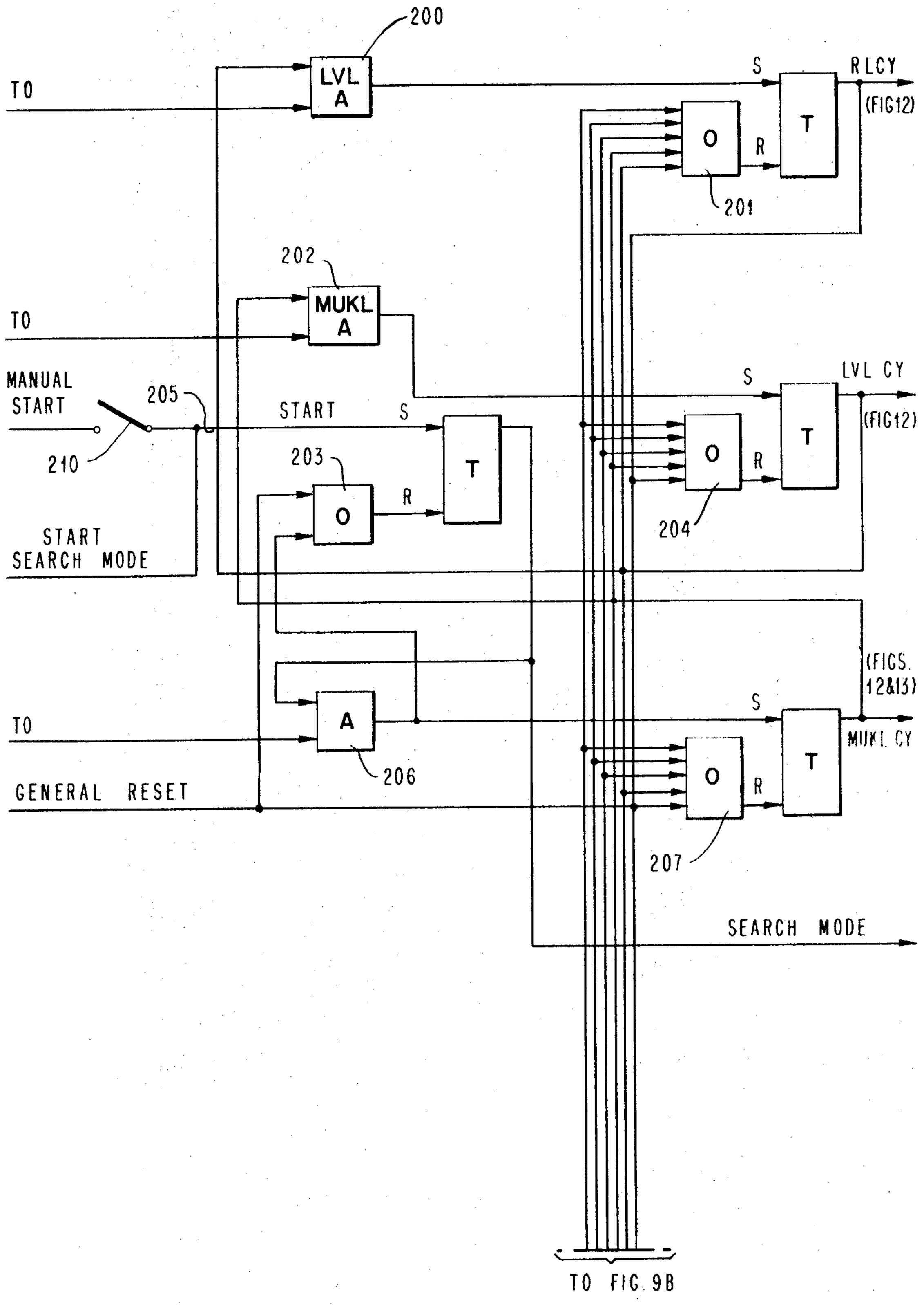

FIGS. 8A–D represent circuitry controlling the generation of compressed keys;

FIGS. 9A and B illustrate search mode clock controls used in a search mode version of the invention.

Figure 10:
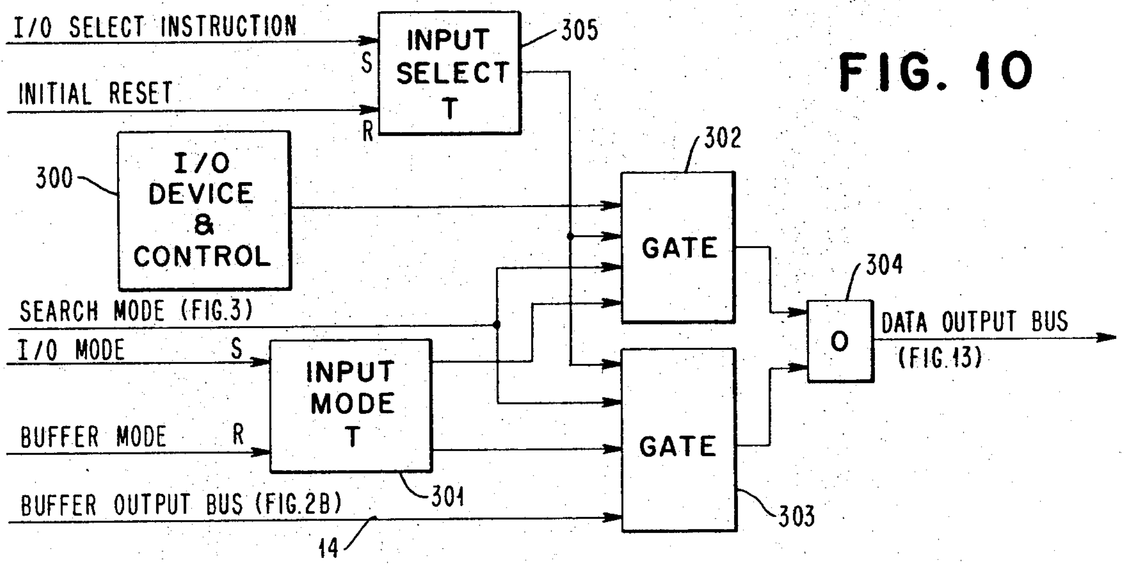
Figure 11:
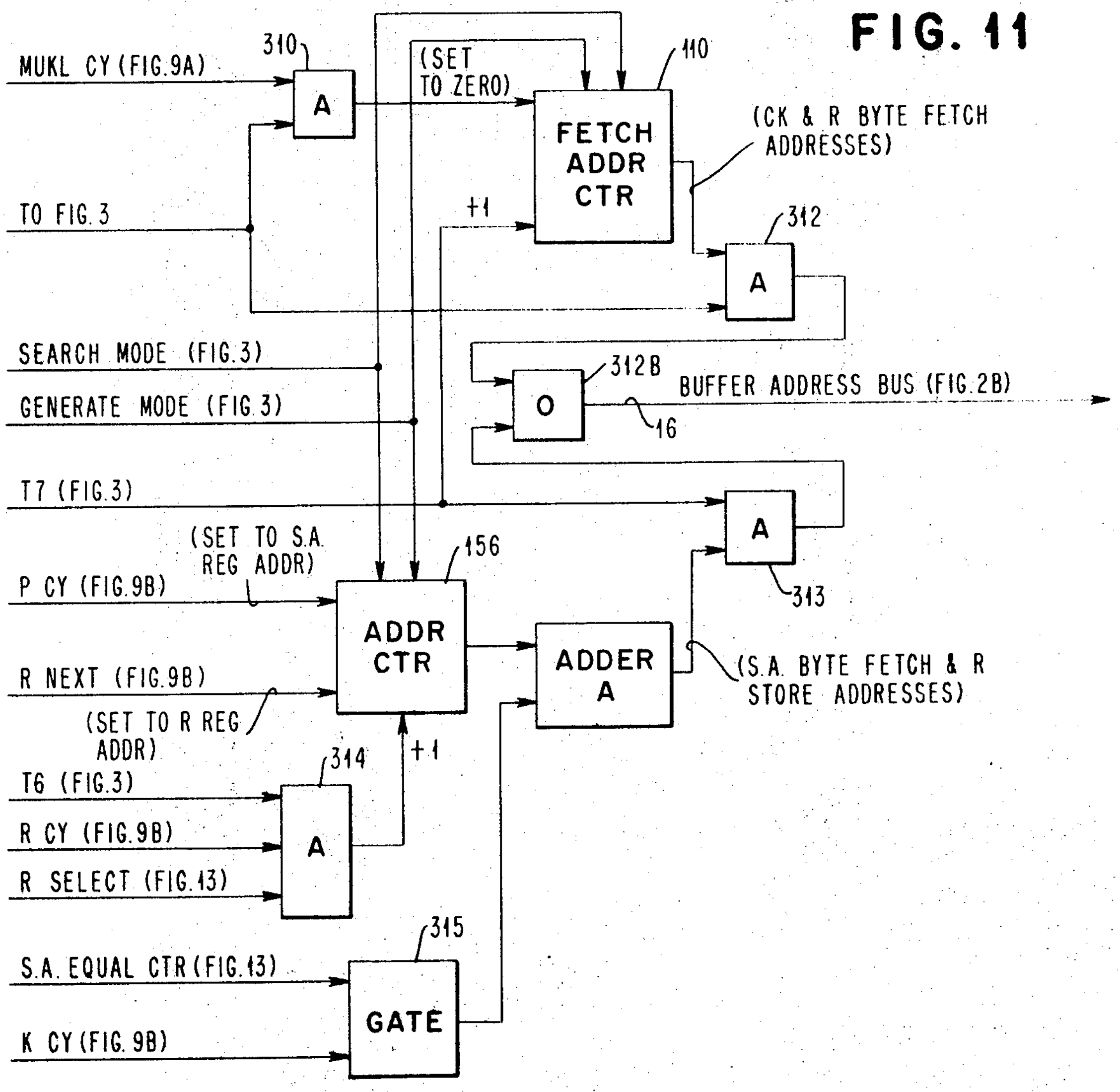
Figure 12:
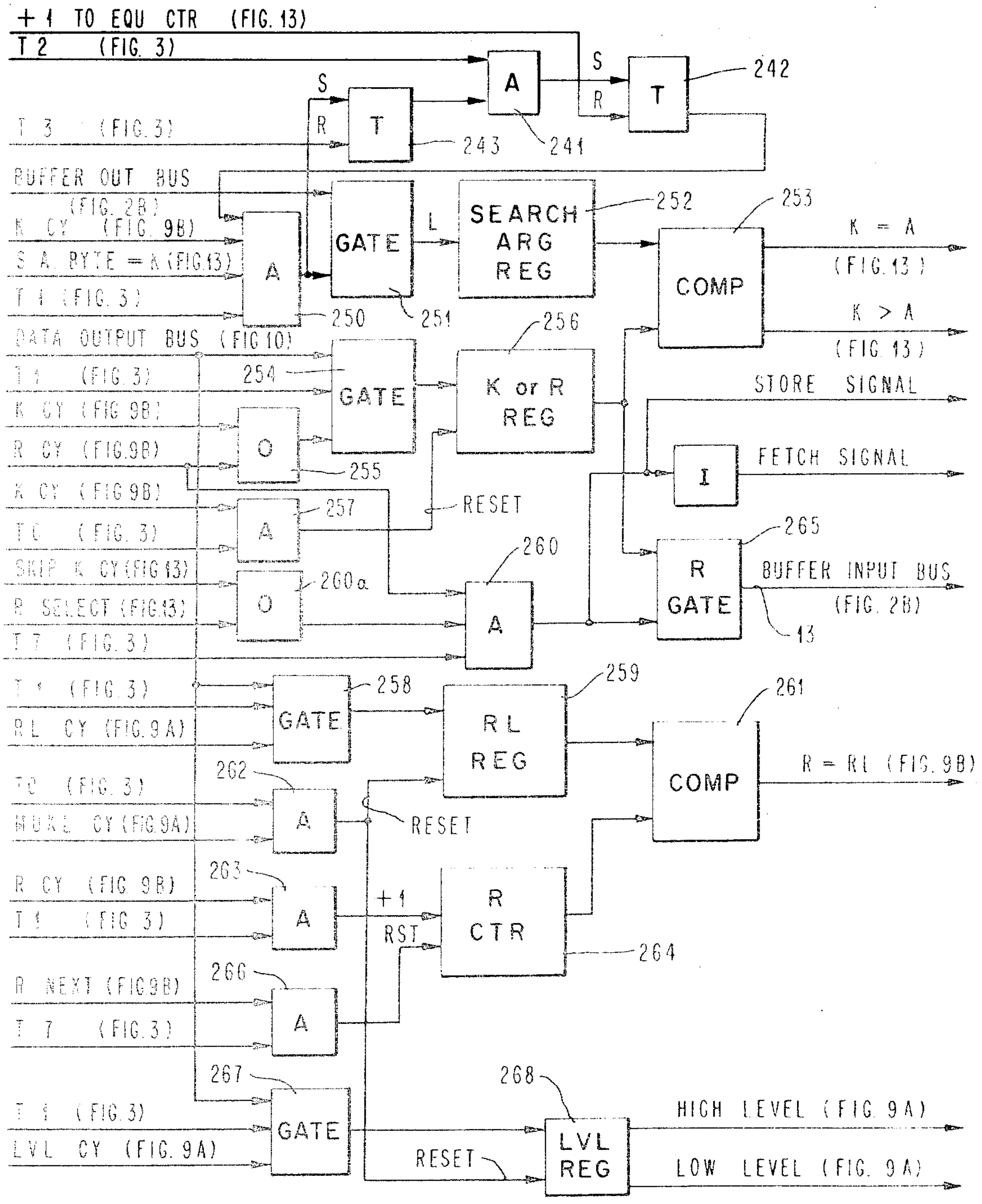
Figure 13:
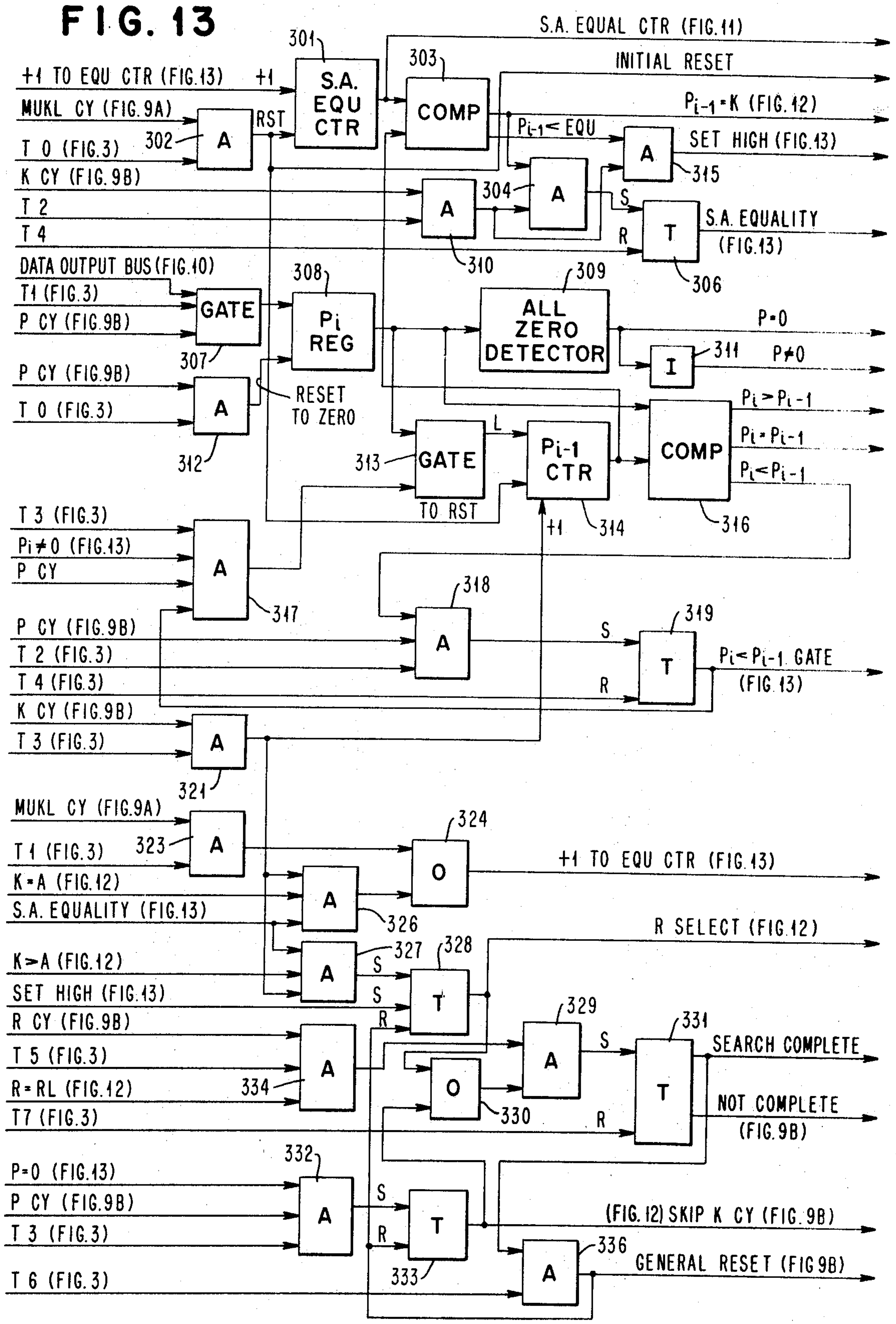

FIGS. 10 and 11 show memory controls used for generation and searching a compressed index;

FIGS. 12 and 13 represent circuits used in searching a compressed index; and

Figure 14A:
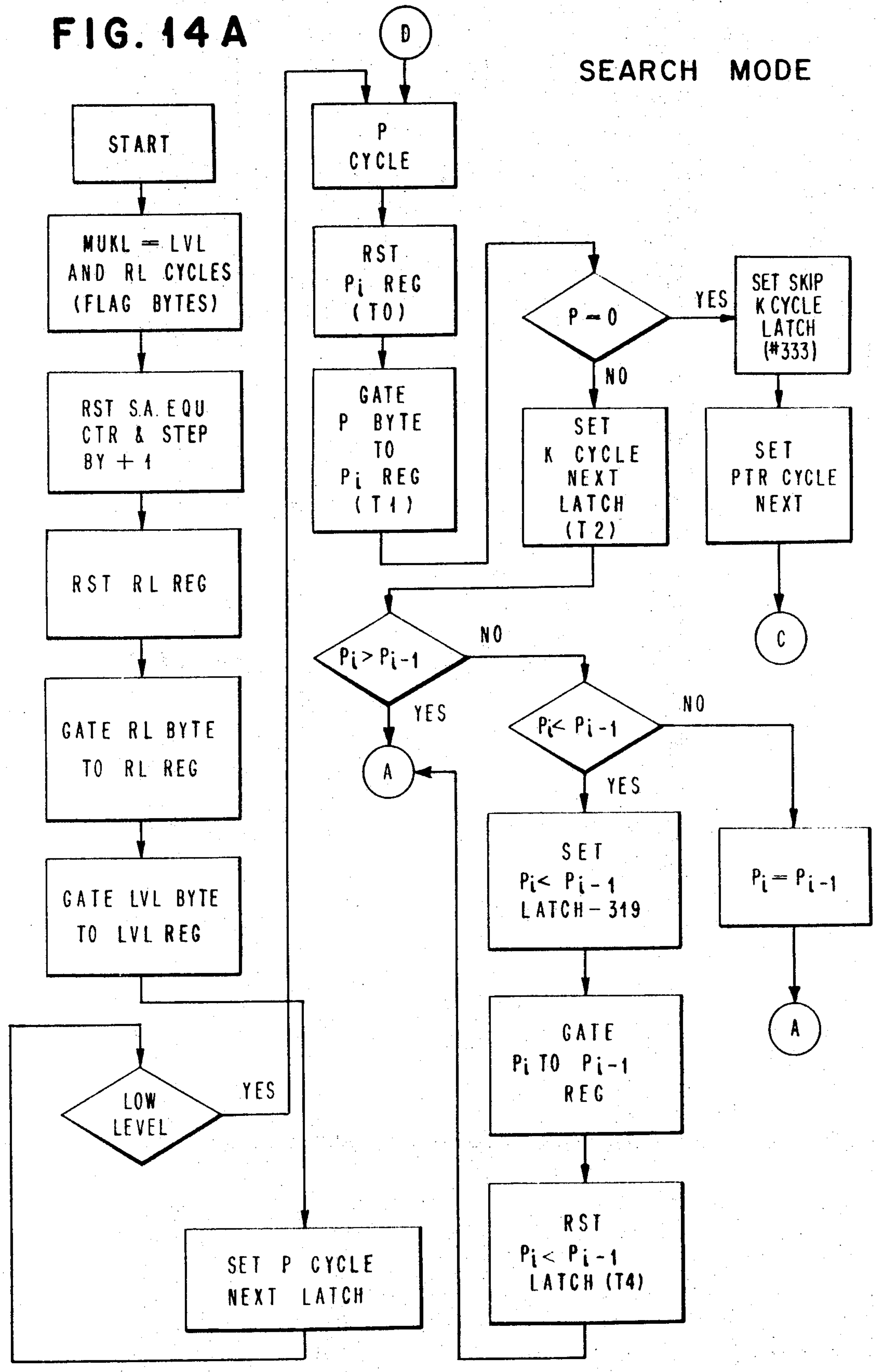
Figure 14B:
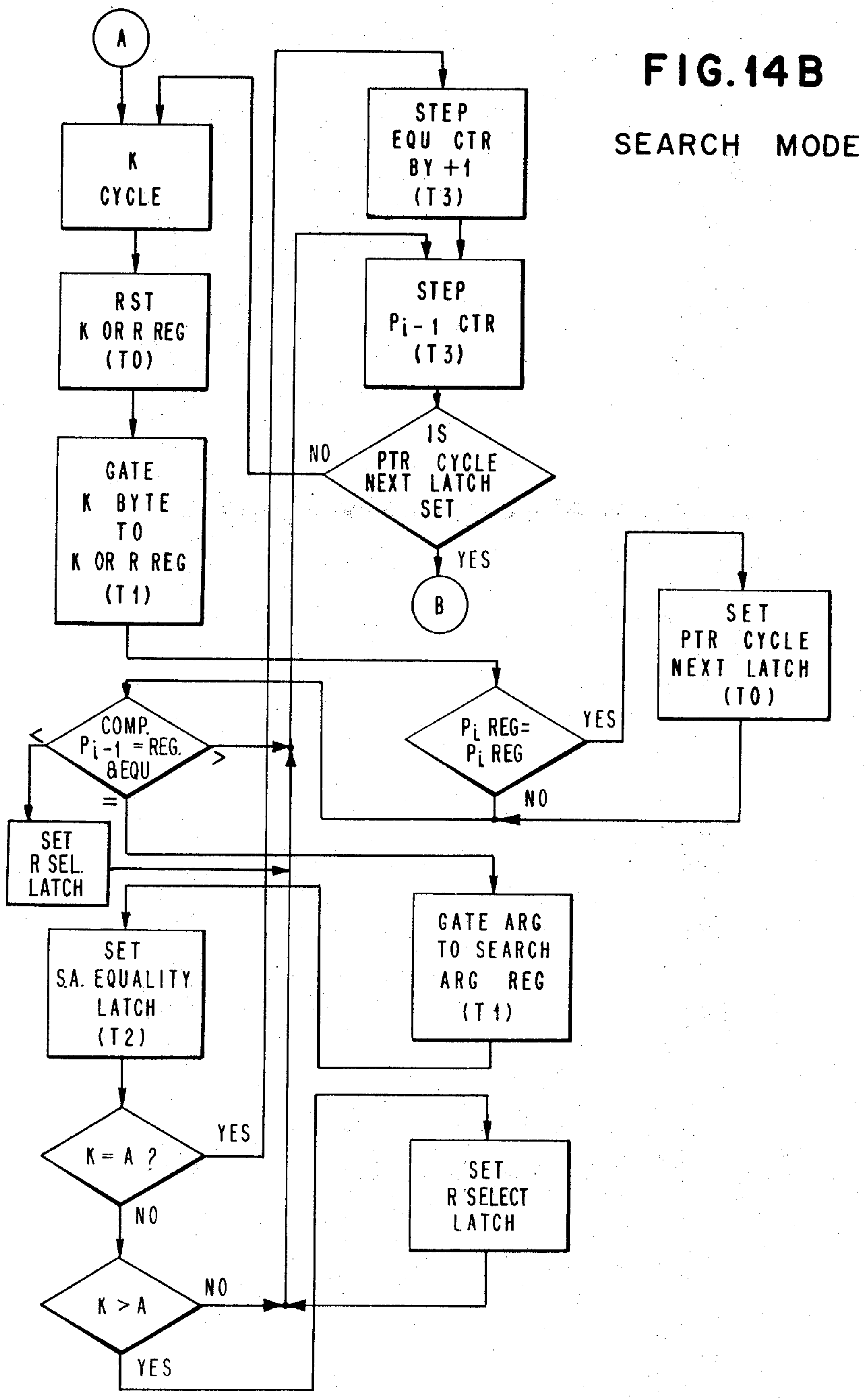
Figure 14C:
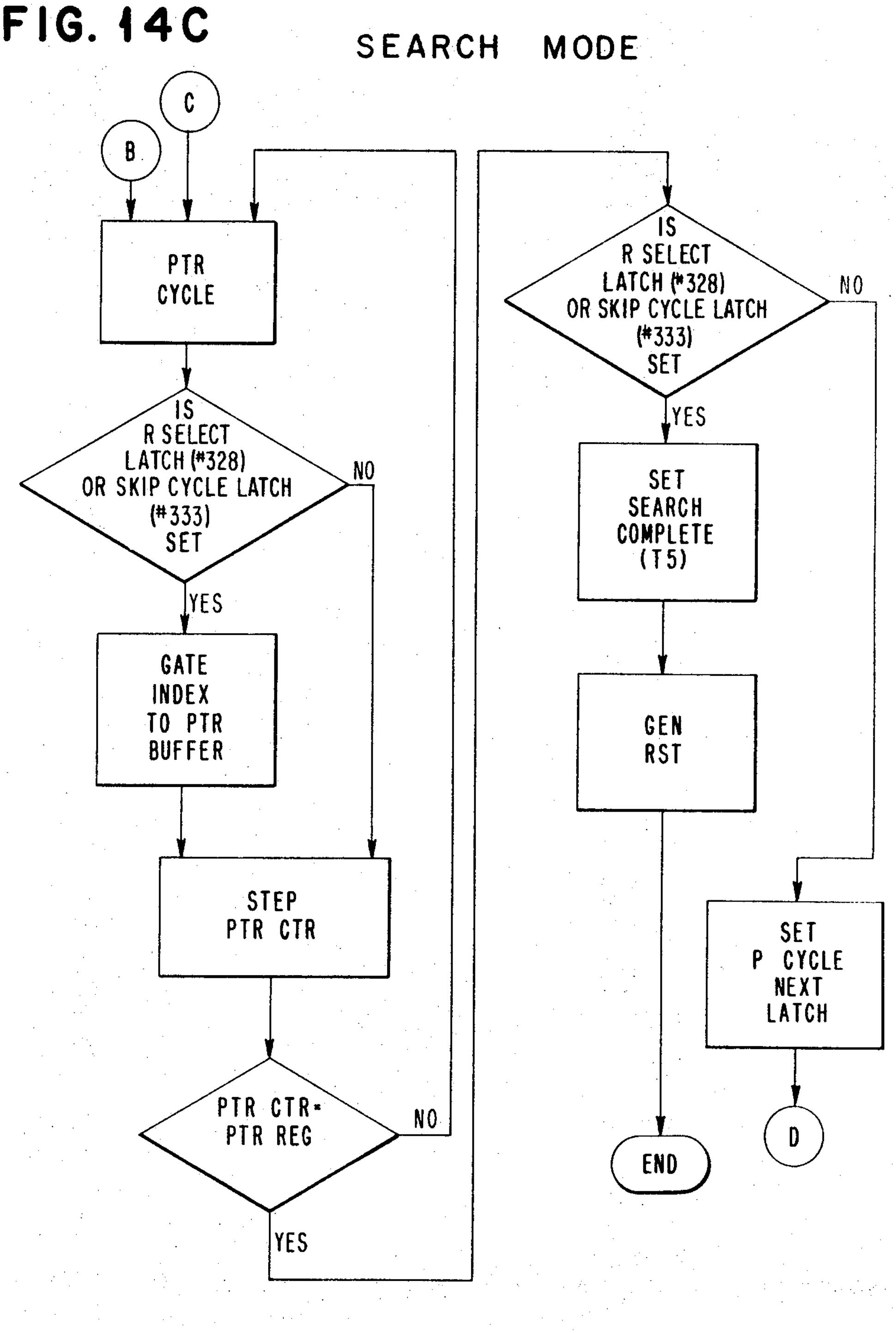

FIGS. 14A–C represent the method used during search mode.

GENERATE MODE METHOD

In Generate Mode, the invention uses a sequence of uncompressed keys (UK's). The keys may comprise a search index for any type of items. For example, each key may be a name, a man number, or any descriptor in alphabetic, numeric, and/or special character from which may represent an item such as a magnetic record, paper file, or inventory device, etc. The address (location) of the item which the key represents is carried along with each key. Such address is referred to hereafter as a "pointer" since the address in effect "points" to the location of the source item represented by the key. Although the items are preferably in machine-accessible form, they also may be manually retrievable by using the pointers. The actual locations of the items may be in any order in relation to their keys; that is, they may be located randomly, sequentially, etc.

If the uncompressed keys are initially obtained in an unsorted order, they are arranged in a sorted sequence before beginning the operation of the Generate Mode. Examples of uncompressed key sequences are the names in a telephone directory, the names of people in the United States, the man numbers of the employees in a corporation, the titles of all the books in a library, part numbers of items in an inventory, etc. No two uncompressed keys may be the same in the sequence; for example, addresses are appended to like names to distinguish them.

The sorted key order is determined by a chosen collating character sequence, such as numeric, alphabetic, EBCDIC, ASCII, etc. For example, the alphabetic collating sequence is used in the telephone directory, or in a language dictionary. When sorting the keys, the pointer with each key is carried along with it to wherever it is positioned in the sorted sequence. For the purposes of the detailed description of this invention, ascending sequences are assumed; but it will be clear that the same principles apply to descending sequences.

If the UK sequence is very long, it may be broken into sequential subgroups within the overall sequence. The size of the smaller sequential groups may be chosen to be compatible with a physical record size used by an I/O device in a computer system. Each such physical record may be handled as a separate input unit for purposes of this invention.

Each such subgroup will hereafter be referred to as an "uncompressed index record."

Figures 1A, 1B:
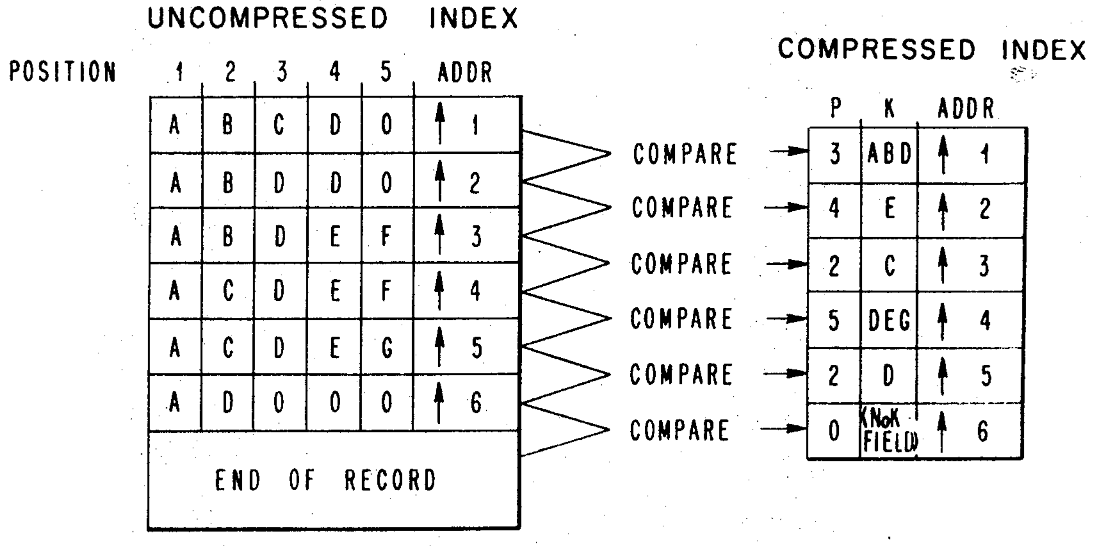

FIG. 1A represents an uncompressed index record, while FIG. 1B represents the compressed keys generated therefrom by this invention.

The first compressed key (CK) at the top of FIG. 1B is derived from a comparison of the first and second uncompressed keys (UK's) at the top of the uncompressed index in FIG. 1A. The second CK is derived by comparing the second and third UK's, etc. Finally the last CK is derived when the UK is compared with the End of Record indication, which is the last comparison for the Uncompressed Index Record. The pointer address associated with the last CK is placed at the bottom of FIG. 1B.

Every comparison is considered to begin from the high-order character side of the uncompressed keys.

Each CK (except the last) is comprised of two parts, a Position byte (P), and one or more Key bytes (K). Both the P and K bytes are determined during the comparison of two adjacent uncompressed keys. The P Byte is set to a value which represents the location of the first unequal bytes from the high-order side of the UK's being compared. If two UK's compare equal at their highest-order byte positions, P has a value of one. If the first byte positions compare equal, and the second byte positions are unequal, P has a value of two. In this embodiment, P is set to zero before beginning the comparisons for an uncompressed index record, and for the last comparison of each compressed index record.

The K field is comprised of one or more bytes taken from the second UK in any compared pair of UK's. The particular bytes taken for the K field are determined by the two values of P generated by the current and last UK comparisons. If the current P value is equal or less than the last P value, only a single K byte is provided, which is the first unequal byte in the second UK of the current comparison. However, if the current value of P is greater than the last value of P, the K field comprises a plurality of bytes of the second UK in the current comparison located after the byte position defined by the last P value and all following bytes up to and including its first unequal byte at the current value of P. Thus all K bytes, except the last, compared equal.

A summary of the preceding rules for generating any current ($i$) compressed index follows:

1. Generation of $P_i$

To generate the $i$ compressed key, the $i$ and ($i$+1) UK's are compared byte by byte, starting with the most significant byte position until a difference is detected. (The subscripting $i$−1, $i$, and $i$+1 respectively represents the last key, the current key, and the next key in the sorted sequence. The byte location at the first unequal byte determines the current P value ($P_i$). (The comparison needed to generate the CK can end with the first unequal byte, but the comparison may continue for housekeeping purposes.)

2. Generation of $K_i$ (bytes in the K field of the CK being generated)

The last P value ($P_{i-1}$) is retained to determine $K_i$.

a. if $P_i \leq P_{i-1}$;

Only one byte is recorded in the K field, and it is at the $P_i$ byte position of the $i$ and $i$+1 uncompressed key pair.

b. if $P_i > P_{i-1}$;

The number of bytes to be recorded in the K field is $P_i - P_{i-1}$. The K field starts with the byte at position $P_{i-1}$ +1 and continues up to and including the byte at position $P_i$.

3. Pointer

The pointer (R) associated with the $i$ uncompressed key (while comparing the $i$ and $i$+1 UK's) is attached to the $i$ compressed key to provide a compressed index entry of the form, PKR.

4. End of Record

The number of generated CK's equals the number of UK's in the uncompressed index record. However the resulting CK's have only a fraction of the bytes found in the uncompressed index record. When the end of the uncompressed index record is reached, the last CK is formed as follows:

a. P is set equal to zero; (denoting End of a Compressed Index Block)

b. K is skipped (no K bytes for this case; and c. the pointer R associated with the last UK is placed next to the zero P byte.

Example:

| | Uncompressed List | | | | | | Compressed Index | | |
|---|---|---|---|---|---|---|---|---|---|
| P= | 1 | 2 | 3 | 4 | 5 | PTR | P | K | PTR |
| | A | B | C | D | | 1 | 3 | ABD | 1 |
| | A | B | D | D | | 2 | 4 | E | 2 |
| | A | B | D | E | F | 3 | 2 | C | 3 |
| | A | C | D | E | F | 4 | 5 | DEG | 4 |
| | A | C | D | E | G | 5 | 2 | D | 5 |
| | A | D | | | | | 0 | | 6 |

SEARCH MODE METHOD

The search Mode uses a Search Argument, which may or may not have been in the source index.

Rules for Searching (Used in FIGS. 11 through 14):

1. The search for a given search argument starts at the beginning of a compressed index block and continues from one compressed key (CK) to the next in a serial manner. The K field in each CK is examined a byte at a time from the highest-order byte, and it is compared with a current argument byte.

2. The $P_t$ byte of each current compressed index being read is retained. Initially, the $P_{t11}$ value is set to zero for reading the first CK. The retained $P_t$ byte becomes the $P_{t11}$ byte when the $P_t$ of the next compressed index entry is read. Hence the length of the first K field is $P_t-0=P_t$. The length of the K field in any compressed index is $(P_t-P_{t11})$ bytes long if $P_t>P_{t11}$.

3. The compressed index is compared against one search argument byte at a time, starting with the highest-order byte of the search argument. Whenever a search argument byte equals a K byte the appropriate search argument byte is replaced by the next lower-order byte in the search argument. The appropriate search argument byte sequentially is compared with the K bytes beginning with the highest-order K bytes in each CK. For any CK with $(P_t-P_{t11})>1$, its first compared K byte is at $(P_{t11}+1)$, incrementing to the next lower-ordered K byte when A=K until the K byte at $P_t$ is compared. For any CK with $(P_t-P_{t1})\leq 1$, only the single K byte identified by $P_t$ is compared to the argument byte. This is done as follows:

a. An equal count EQU is maintained of the current number of Argument bytes found equal to K bytes during the comparison scan along the CK's. Each time $A=K$, count EQU is incremented by one, only if EQU (the current Argument byte position) is equal to the UK position of the K byte being compared at the moment.

b. If $A>K$ in any comparison between the appropriate $A$ and $K$, the search should continue by going to the next compressed key.

c. The search is ended whenever $P_t<$EQU, or by the first comparison that finds $A<K$ and Count EQU equal to the UK byte position of the K byte, and this compressed key has associated with it the desired pointer.

d. The desired pointer associated with the search-ending CK is used to fetch its represented item, which is then retrieved.

e. Verification may be performed by comparing the retrieved item with the search argument. They will compare-equal if the item was represented in the original uncompressed index. A compare-unequal indicates that the item was not originally represented; and the compressed index can then be updated to represent the new item, if required.

GENERATE MODE SYSTEM

1. General

Figure 2A:
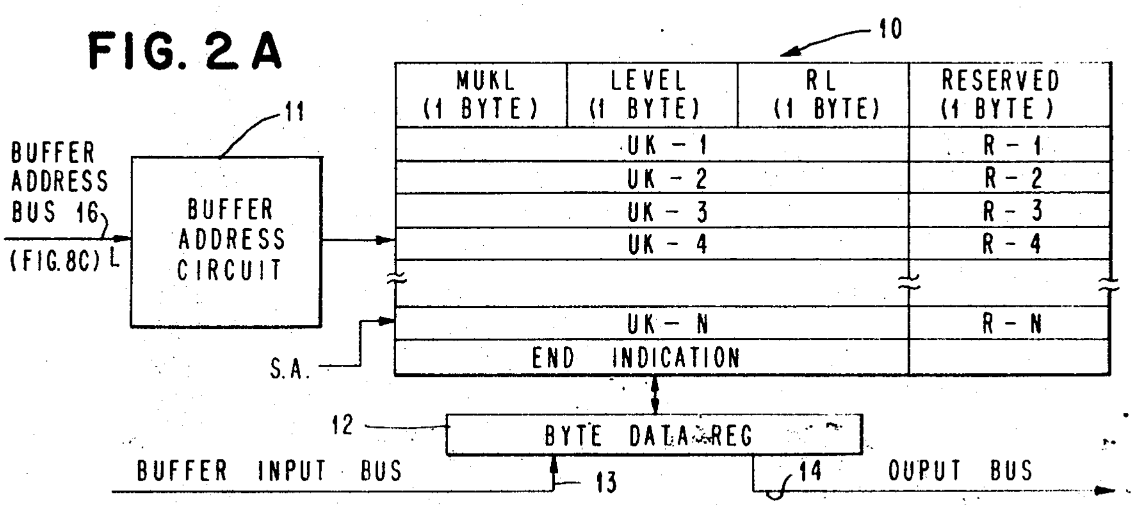

In FIG. 2A, an input for a Generate Mode operation is provided to a memory buffer 10 with the illustrated UK (Uncompressed Key) data organization. Buffer 10 stores data in bytes (characters), each may comprise 8 data bits. (Each stored byte may include a conventional parity bit for error checking. Since the parity bit is not important to the basic objectives of this invention, it is not further discussed.)

Figures 3, 4A, 4B, 5A, 5B:
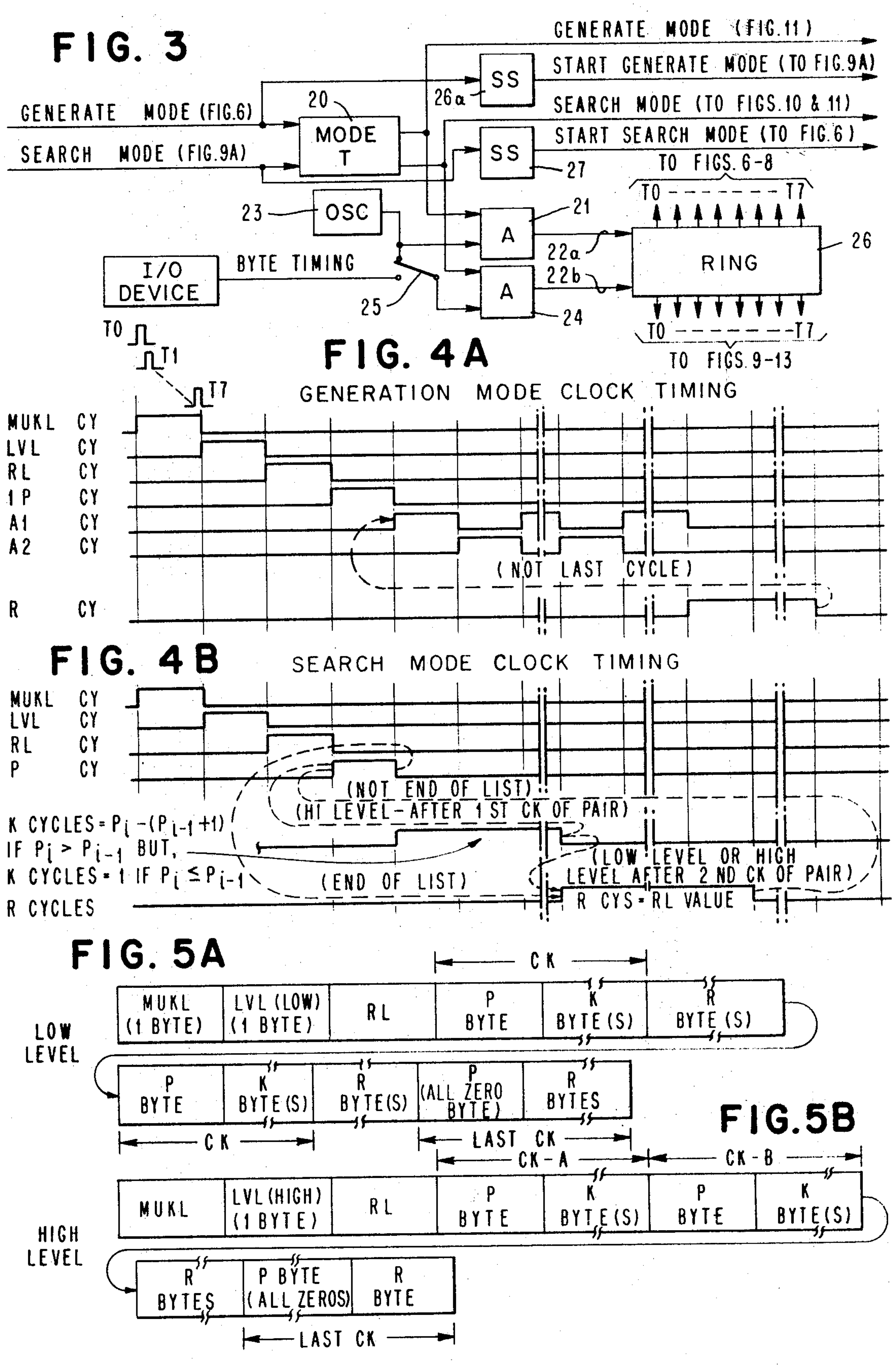

Operation of the invention is begun by a Generate Mode or Start Mode signal input to FIG. 3. A Start signal may be initiated in a number of ways. It may be generated manually by closing a switch 50 in FIG. 6 or 210 in FIG. 9A. But preferably the Start signal is initiated from a computer system in response to execution of a particular instruction that may be conventional. The instruction may be a particular Channel Command Word (CCW) when the subject invention is provided in a computer channel or in input/output (IQ) device control. When the invention is entirely executed in the computer's central processor (CPU) a special instruction, such as a particular supervisory call (SVC) instruction may start the operation. In any case, the instruction operation code or SVC interrupt code needs to distinguish between the Generate Mode and Search Mode to bring up the correct input signal to Mode Trigger 20 in FIG. 3.

The first four bytes in buffer 10 are flag bytes which provide basic parameters that define the data organization in the buffer. The initial byte MUKL contains a value that defines the length (in bytes) of each register (UK−1, UK−2.......UK −N, which are respectively reserved for uncompressed keys. Each register has the Maximum Uncompressed Key Length (MUKL).

The LVL byte designates a level (LVL) for the compressed index which is to be generated from the uncompressed index in buffer 10 initially. Multilevel indexing is conventionally used to speed searching. The invention can be applied to generate any level of index.

The RL byte provides the length in bytes of each pointer register (R−1, R−2.........R−N). The number of bytes needed depends on the type of address used to fetch an item to be retrieved. For example, if it is a record on a disc, a ten byte length might be provided. The next byte is reserved for the first generated P byte.

The UK and R registers follow. Each UK register is followed by a related R register, with the same numerical descriptor. For example, the pointer entered into register R−1 addresses the UK entered into register UK 1.

The use of the MUKL and RL flag bytes permits the sizes of the UK and R registers to easily be varied under different situations where the maximum length for the received uncompressed keys or pointers may be different. No change need be made to the size of buffer 10 to accommodate a larger number of uncompressed keys and pointers when the maximum size of either or both is made smaller, merely by entering smaller values in either or both flag bytes.

The highest-order character of any uncompressed key is entered into a UK register with left-side byte alignment in FIG. 1. That is, the first (most significant) character of the key is entered in the leftmost byte position in the UK register. The remaining characters of the key follow immediately to the right. Any unused byte position in the UK register to the right of an entered UK is padded with the lowest character in the collating sequence of the used character set, for example, a zero, blank, or null character. Hence any entered uncompressed key may be variable in length up to the maximum size of its UK register. An Uncompressed Key larger than a UK register is truncated on its low-order side; that is, characters on its left side, which do not fit into the UK register, are discarded. Such truncation does not necessarily affect the compressed key generated therefrom. The truncated UK must still be a unique key.

The last pointer R−N of the input stream may be followed by an End Indication byte (or bytes) to indicate the end of the Uncompressed Key record.

The manner of input to buffer 10 is not part of this invention, but it will be evident that such input can be provided by conventional programming of a general purpose computer.

The circuits disclosed in the following drawings operate on a clock cycling basis. The Generate and Search Modes use different clock control cycling sequences. Within the same mode, the clock cycling sequence may be different for higher levels than for the lowest level.

In any mode, a single cycle of pulses T0–T7 is generated by the Synchronizing Pulse circuit in FIG. 3. These pulses are transmitted to the clock controls in FIG. 6 to handle each byte of data, when Mode trigger 20 is set by a Generate Mode signal.

An entire clock-control cycling sequence in Generate Mode occurs once per loading of buffer 10 with a list of compressed keys. The clock controls in FIG. 6 determine the sequencing required for the operation of the described embodiment for Generation Mode operation. Both sequential sequencing and out-of-order (branching) sequencing are controlled by the clock control in FIG. 6. Its sequencing of cycle types is different for High Level and Low Level operation which are represented in FIGS. 5A and 5B.

Figure 7:
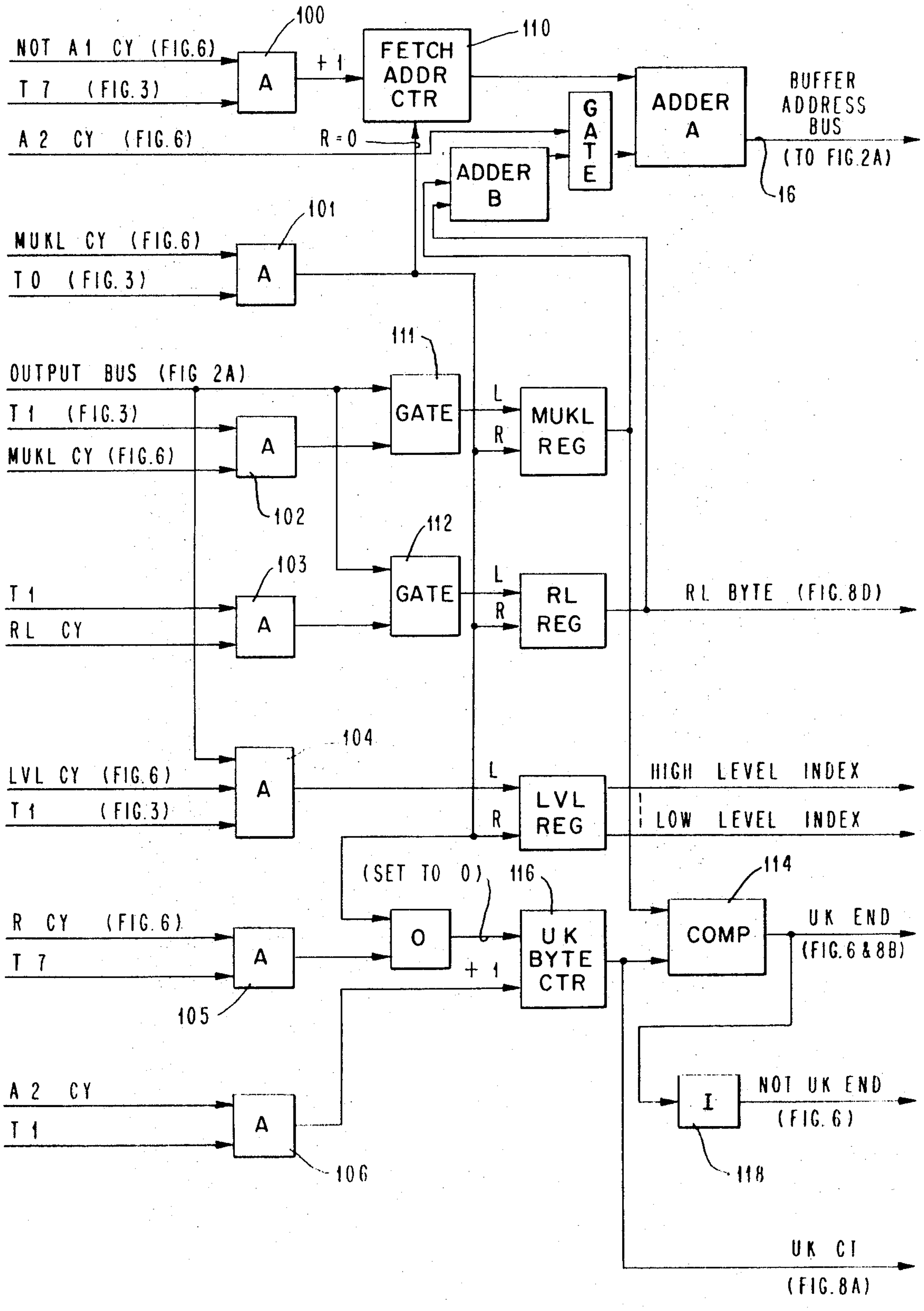
FIG. 7 shows buffer address and other controls used during compressed key generation.

In FIG. 3 when Mode trigger 20 is set by a Generate Mode signal (which may be derived from a computer instruction), it then enables an AND-gate 21 to pass pulses from an oscillator 23 to a ring circuit which then provides output pulses T–T7 to FIGS. 6–8. Each cycle of output pulses T0–T7 determines a cycle of operation for the clock controls in FIG. 6, with the related timing shown at the top of FIG. 4A.

FIG. 4A provides waveforms representing the clock control sequencing used by the Generate Mode embodiment. The clock controls in this embodiment cause a sequence of seven types of Generation mode cycles, each used for a different purpose. In FIG. 4A, a cycle is active when any wave is at high level and inactive at the down level. Each clock control cycle advances the fetching address in an Address Counter 110 in FIG. 7 by one byte location. The first is the MUKL cycle which induces the transfer of the MUKL byte from Memory 10 to a MUKL register in FIG. 7. A LVL Cycle immediately follows to cause the transfer of the Level byte to a LVL Register in FIG. 7. The level byte determines whether a High level or Low Level compressed Index should be generated, as represented in FIG. 5A or 5B. An RL Cycle then follows the similarly transfer the pointer length (RL) byte to the (RL) Register in FIG. 7. The RL byte value is presumed at this time to indicate the Lowest Level Index. Next a 1P Cycle occurs, which causes no transfer, and only stops the memory address. The 1P byte is skipped during this fetching sequence from buffer 10.

An A1 cycle follows the RL cycle in FIG. 4A to fetch the highest-order byte in UK–1. An A2 cycle follows the A1 cycle to fetch the highest-order byte in UK–2 for a comparison of these same-order bytes. Address indexing is performed upon the A1 byte address to fetch the corresponding A2 byte. To do this, the address of the A1 byte (of the *i* UK) is indexed by the sum of the values in the MUKL and RL registers in order to address the corresponding A2 byte (of the *i*+1 UK). This is done in FIG. 7 by Adders A and B to obtain the effective address of the comparand byte during the A2 cycle. The Fetch Address Counter 110 in FIG. 7 maintains the current fetch addresses, except the A2 byte address. The A2 effective address from Adder A addresses the byte to be fetched from buffer 10. By being gated by the A2 clock cycle, Adder B only provides a non-zero output during an A2 cycle. When gated, Adder B provides an output which is the sum of the contents in the MUKL and RL registers. Hence Adder A normally recognizes its Adder B input as having a zero value, except during the A2 cycle.

Figure 8A:
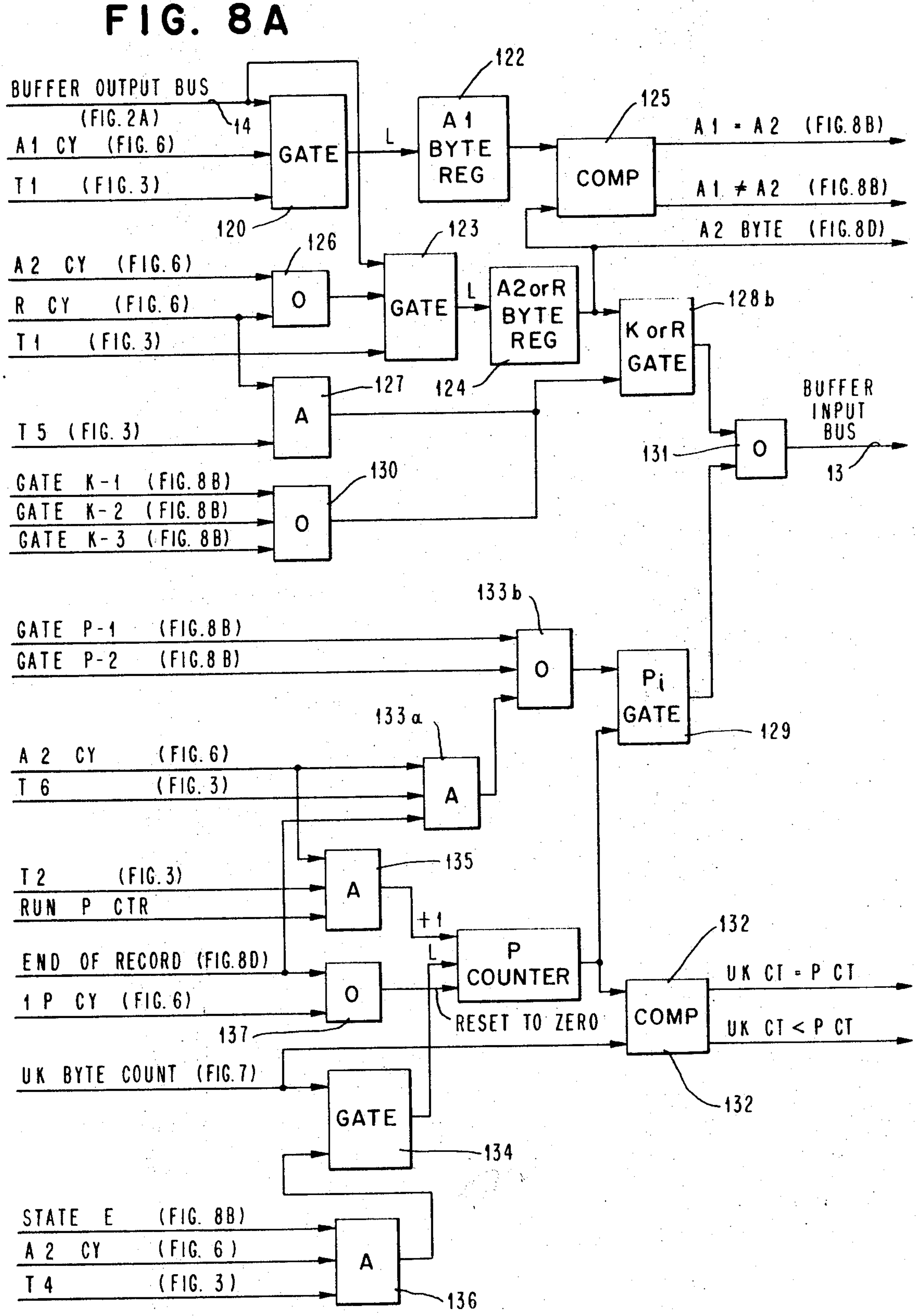

Accordingly the leftmost bytes in registers UK–1 and UK–2 are fetched by the initial A1 and A2 cycles, and they are respectively transferred into the A1 Byte register and A2 Byte register in FIG. 8A.

A Comparator 125 compares the bytes in the A1 and A2 registers in FIG. 8A. After the comparison of the highest-order bytes, the next highest-order bytes are fetched by the next A1 cycle followed by the next A2 cycle, and a resulting comparison of these two bytes. Clock cycles A1 and A2 alternate in this manner for a number of times determined by the value set into the MUKL register in FIG. 7, which is indicated by the output of a comparator 114 in FIG. 7.

The Fetch Address Counter 110 is stepped at the end (T7) of every clock cycle, except at the end of any A1 cycle, since then the A1 address must remain to be indexed to the corresponding A2 byte. In the latter case, the Fetch Address Counter 110 is stepped to the next byte address at the end of each A2 cycle by a T7 pulse to address the next lower-order A1 bytes. A UK Byte Counter (CTR) in Fig. 7 is stepped by each A2 cycle (at T1 time on gate 106) to indicate the byte position being compared in the current UK pair.

The last byte fetched from each register UK–*i* and UK–*i*+1 is indicated by a UK END output from Comparator 114 in FIG. 7, which signals when the UK Byte Counter (that is being stepped by the A2 cycles) reaches the end of the UK registers being compared (the MUKL value).

During the last A2 cycle for a UK pair, Fetch Address Counter 110 in FIG. 7 is stepped by gate 100 at T7 time to address the first byte in the first pointer register R–1 in buffer 10. This initiates the first R cycle as shown in FIG. 4A. The R cycles repeat once per pointer byte transfer for the number of bytes determined by the value set into the RL register in FIG. 7. Each R cycle steps an RL counter in FIG. 8D at T1 time through gate 186 to maintain a current counter of fetched R bytes. A comparator 189 receives outputs from the RL Counter and RL Register to signal an Equal On RL output when the last byte of a pointer is fetched.

Then the Clock Controls in FIG. 6 branch 148 initiate an A1 cycle to begin a comparison for the next pair of uncompressed keys in registers UK–2 and UK–3. (That is UK–*i*+1 of the last pair becomes UK–*i* for the current pair.) The cycled interleaving of A1. and A2 cycles repeats in the manner previously described, which is for the uncompressed keys in registers UK–2 and UK–3 following the comparison of the UK's in UK–1 and UK–2. This automatic addressing in buffer 10 occurs because Fetch Address Counter 110 in FIG. 7 addresses the highest-order byte in register UK–2 when it is stepped from the last byte of R–1. Register UK–3 is addressed during each A2 cycle by indexing the current A1 address with the sum of the MUKL and RL register contents as previously explained.

Figure 8B:
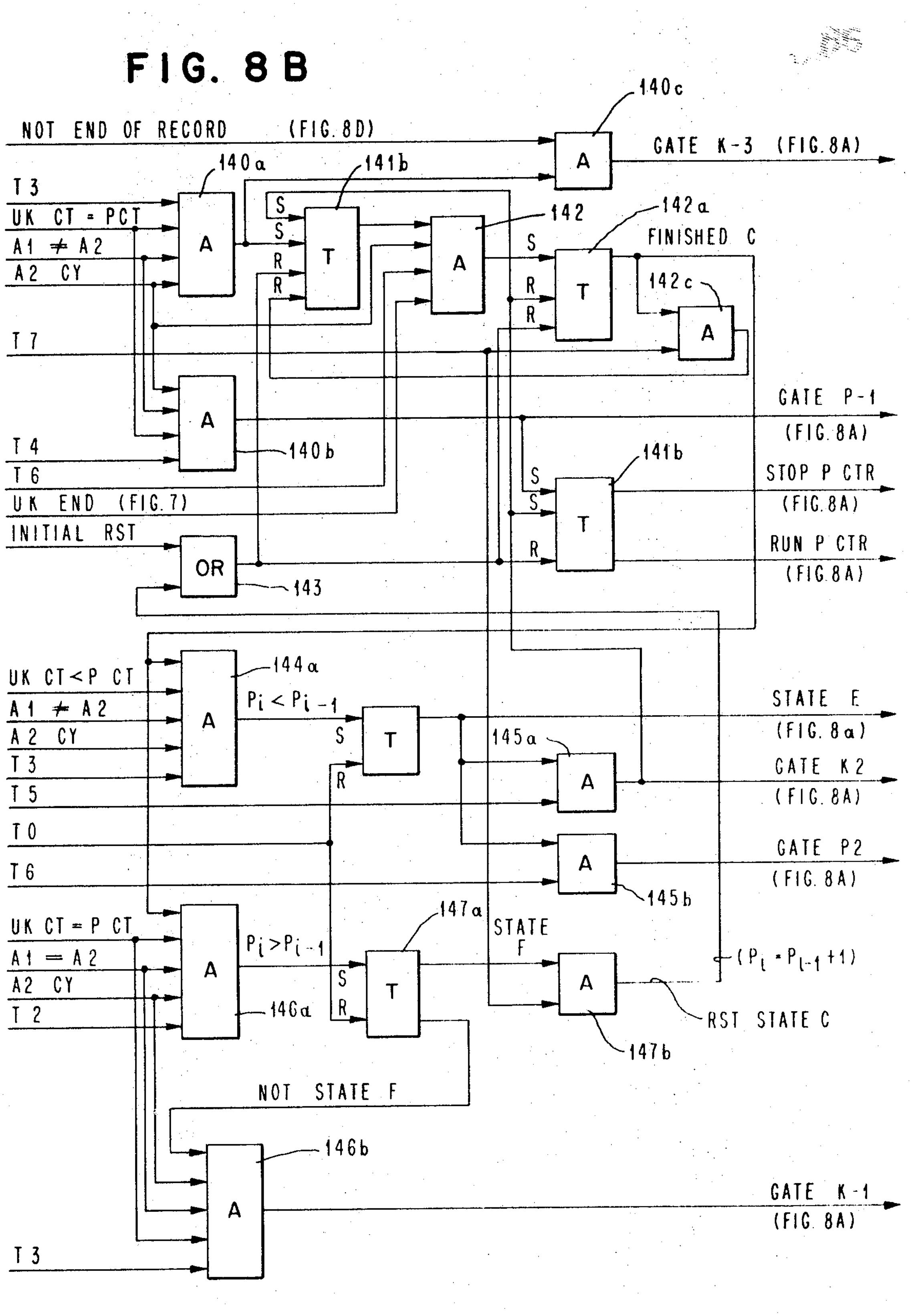
Figure 8C:
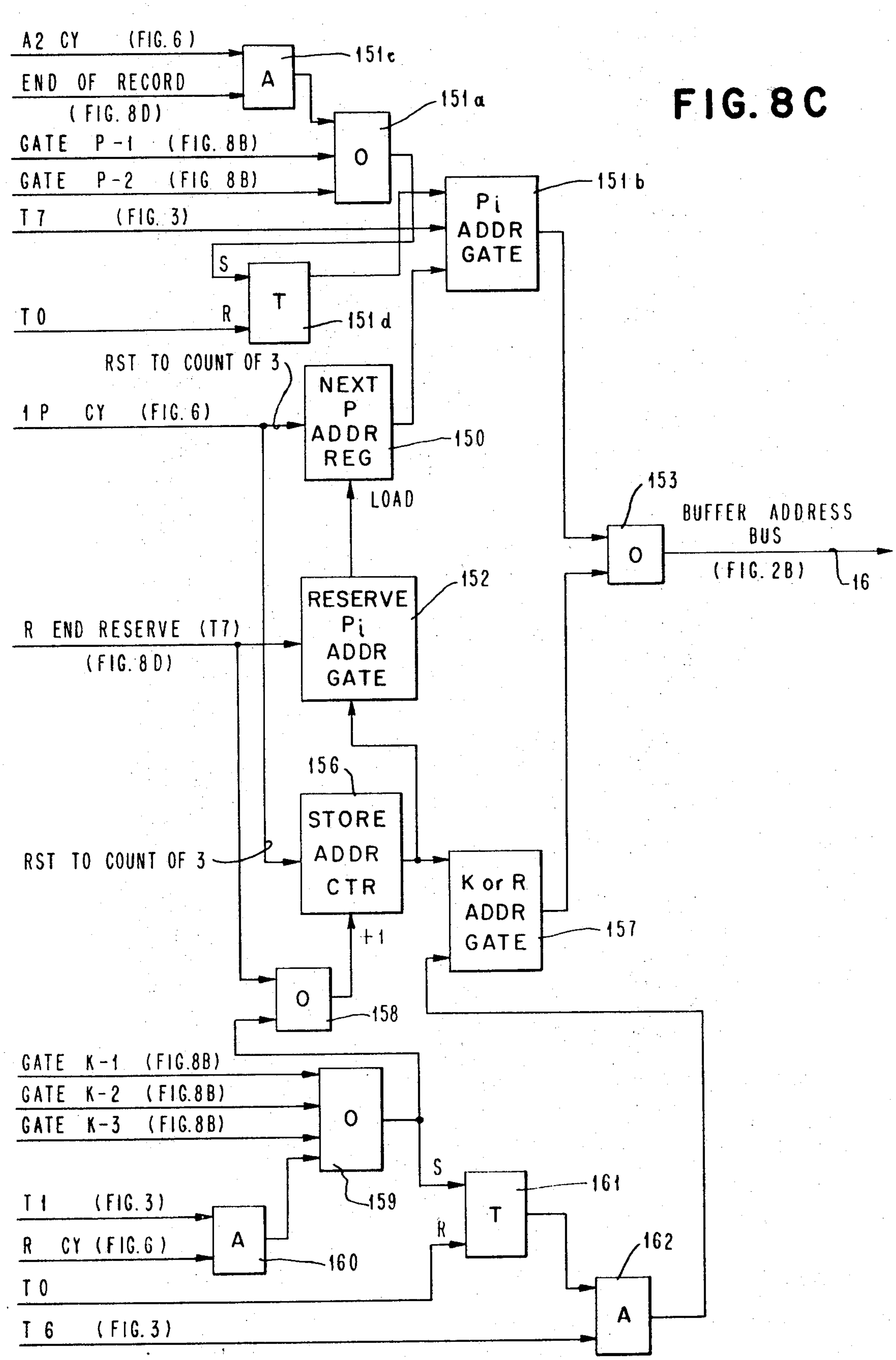
Figure 8D:
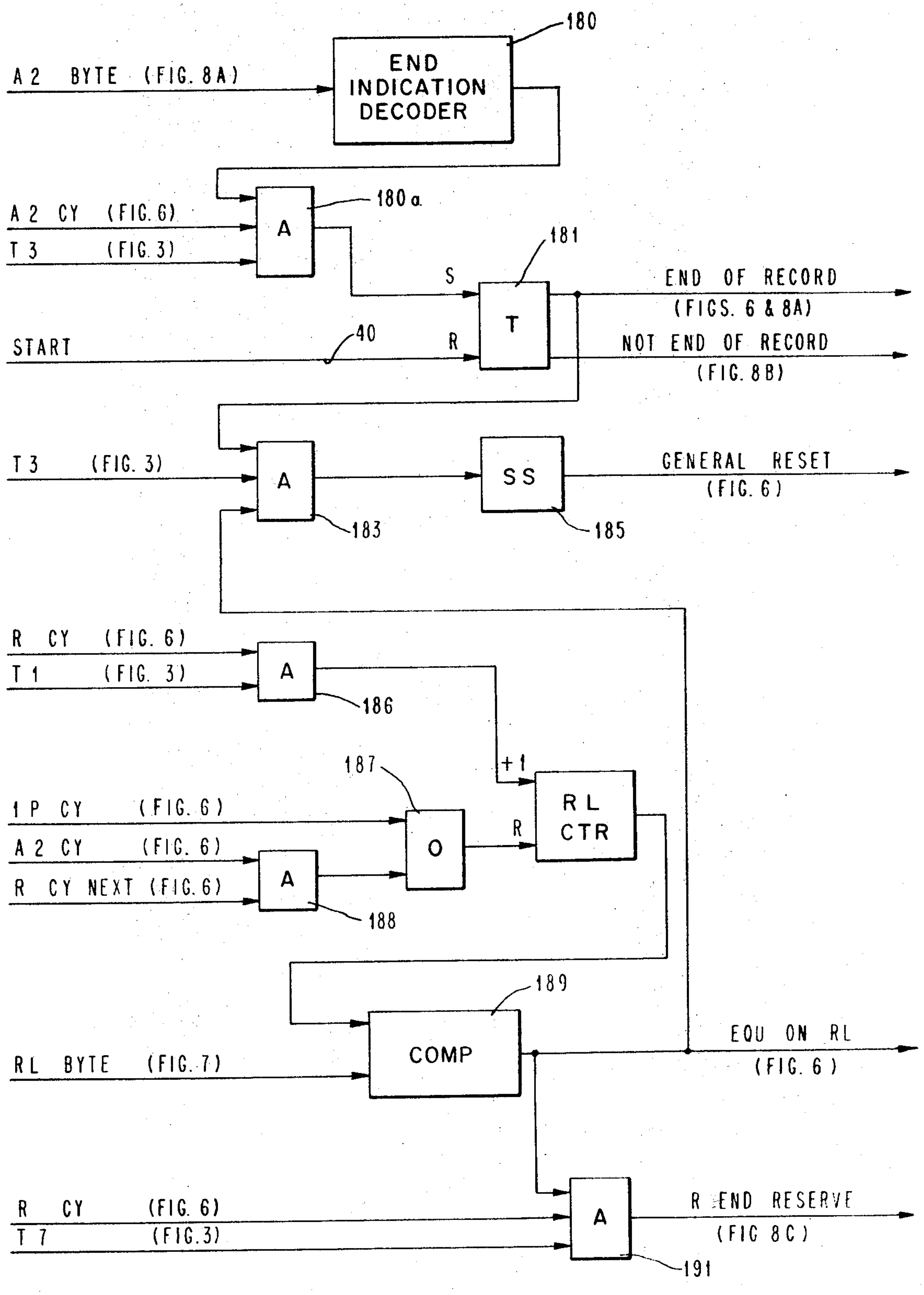

This sequence of comparing every next pair of uncompressed keys (*i* and *i*+1) following each pointer continues until the (*i*+1) entry is sensed to be an End of Index indication by an End Indication Decoder 280 in FIG. 8D. The initial A2 cycle for this last comparison results in the first End indication byte being gated into the A2 register in FIG. 8A. The End Indication Decoder Circuit 180 in FIG. 8D examines each byte in the A2 register for the End of Index byte coding. When sensed, it signals End of Uncompressed Record for buffer 10 and that a last CK entry should end the corresponding Compressed Index.

2. Specific

A Generate Mode signal from FIG. 3 to FIG. 6 sets a Start trigger 45. When set, Start trigger 45 conditions an AND-gate 52, which is actuated by the next to clock pulse from the clock In FIG. 3. The output from the gate 52 resets the start trigger through OR circuit 49 and sets a trigger which provides an MUKL Cycle output. This output is active during any MULK cycle. It causes the transfer of the MUKL byte from buffer 10 in FIG. 2A to the MUKL register in FIG. 7, as previously described. The MUKL trigger setting assures that all of the other cycle triggers in FIG. 4 are in reset state by providing its output through OR circuits 36, 42, 44, 48, 51 and 56 to the reset inputs of those triggers. Also, the MUKL Cycle output conditions the LVL cycle next from the clock controls by conditioning an AND-gate 46.

The T0 pulse from the next cycle of the Ring in FIG. 3 passes through gate 46 to set a trigger that provides an LVL cycle output. The LVL cycle output resets the MUKL cycle trigger through OR circuit 53 and assures the reset of all other triggers in the Generation Clock Controls. The LVL byte is transferred during the LVL Cycle, as previously explained.

A RL Cycle trigger is set by the next T0 pulse applied to an AND-gate 46, which is then enabled by the LVL Cycle output. The RL Cycle output resets the LVL Cycle trigger through OR circuit 51 and assures reset of all the other cycle triggers.

In a like manner the next TO pulse sets a 1P cycle trigger through an AND-gate 54 which is enabled during the RL Cycle, and the RL trigger is reset by the 1P Cycle output through OR circuit 48.

The following T0 pulse sets an A1 Cycle trigger via OR circuit 38 and an AND-gate 39 being conditioned by the 1P Cycle output. The A1 cycle output resets the 1P cycle trigger and conditions an AND-gate 41.

After a single A1 cycle, the next T0 pulse activates gate 41 to set an A2 Cycle trigger. An AND-gate 43 is conditioned by the A2 Cycle trigger output and also by a Not Equal on MUKL signal, which is active until the lowest-order byte of any UK is fetched. Hence the next T0 pulse passes through gate 43 and OR Circuit 38 to set the A1 Cycle trigger again, which resets the A2 Cycle trigger.

In this manner, alternate setting and resetting of the A1 Cycle trigger and the A2 Cycle trigger occur as long as the Not Equal on MUKL signal persists. When the Not Equal on MUKL signal drops to deactivate AND-gate 43, the A1 cycle trigger can no longer be set by the next T0 pulse.

As a result of a single set of MUKL number of A1 and A2 Cycles, the P and K bytes for one CK are generated from the corresponding *i* and *i*+1 UK pair being compared.

The R cycle is initiated by the first T0 pulse during the occurrence of an Equal On MUKL signal. A single set of R cycles continues for RL number of R cycles which is signaled by an Equal On RL signal to an AND-gate 37 from comparator 188 in FIG. 8D. A single set fetches all the bytes in one R Register in buffer 10 following an *i* UK. The next type of clocking cycle depends upon whether a High Level Index or Low Level Index signal is provided from the LVL Register in FIG. 7. AND-gates 30 and 33 in FIG. 6 are respectively conditioned by one of these signals indicating the Level of Compressed Index required. High and low level sequence formats are represented respectively in FIGS. 5A and 5B. In Low Level operation, each single set of A1–A2 Cycles is followed by a single set of RL number of R Cycles. In High Level operation, two sets of A1–A2 Cycles are followed by a single set of R Cycles.

In FIG. 6, a Low Level signal continuously maintains a Binary Trigger BT in its reset state via an OR circuit 33a. When conditioned by a Low Level Signal, AND-gate 33 is activated by every Equal On MUKL signal to set the R Cycle trigger following every set of A1–A2 cycles. Upon the completion of RL number of R cycles indicated by an Equal On RL signal to AND-gate 37, the A1 Cycle trigger is set to initiate the next set of A1–A2 cycles for comparing the next pair of uncompressed keys to generate the next compressed index.

On the other hand, if a High Level signal is instead provided to gate 30, the Binary Trigger is set (it is initially in a reset state due to the prior general reset). Accordingly in High Level, the first Equal On MUKL signal sets Binary Trigger BT which generates a pulse through Pulse Former 34 (which may be a single shot) to set the A1 Cycle trigger through OR circuit 38. This starts another set of A1–A2 cycles immediately following the first set of A1–A2 cycles to generate two sequential compressed keys as a CK pair in HIgh level. When the Equal On MUKL signal occurs at the end of the second set of A1–A2 cycles, AND-gate 30 is again activated to provide another input to the Binary Trigger, which reverses it to its reset state, which raises its reset output to generate a pulse through P.F. 31, which sets the R Cycle trigger at the time of the T0 pulse. The end of the set of R cycles (indicated by an Equal On RL signal) activates gate 37 to begin a set of A1–A2 cycles as previously described. The last A2 cycle of the set is indicated by the Equal On MUKL signal, which finds the binary Trigger BT in reset state, to cause a second A1–A2 cycle, as previously described.

After the last UK signal is scanned in Buffer 10, a last CK must be generated. It requires a P Cycle followed by RL number of R cycles. OR Circuit 33b in FIG. 6 receives an End of Record signal from FIG. 8D, and causes an R Cycle as the next cycle from the cycle control circuit. RL number of R cycles are measured by the RL counter in FIG. 8D, and a General Reset pulse is provided from Single Shot 185 in FIG. 8D to FIG. 6 to reset the cycle control circuit and thereby end its cycling, until the next start pulse is received.

3. General - Output

It was previously explained how the current fetch address for each flag, UK and pointer byte in buffer 10 is sequentially incremented and maintained by the Fetch Address Counter in FIG. 7. In a similar manner, a store address is sequentially incremented and maintained by a Store Address Counter 156 in time in 8C for each CK and pointer byte to be stored in buffer 10.

The UK and CK operations are concurrent while their byte transmissions from and to buffer 10 are time-multiplexed, since buffer 10 may address only a single byte at one time in the described embodiment.

After being reset, the Fetch Address Counter in FIG. 7 begins by addressing byte address zero (MUKL byte). The initial byte MUKL is considered herein to have a zero displacement address, which may be at any practical base-address location in any type of memory. After being reset, the Store Address Counter in FIG. 8C begins addressing byte address three (1P byte). Hence the initial flag bytes MUKL, LVL, and RL at displacement addresses 0, 1, and 2 are not disturbed by the store operations. They may later be stored with the compressed index, after a compressed index record is generated.

The P byte for the first CK is stored in the reserved 1P byte location in buffer 10. The first K byte is stored to overlay the first (highest-order byte) of the fist UK byte. The CK and associated R bytes follow sequentially without any skipping of byte locations within or between CK's or pointer addresses.

After the initial one byte lag of the CK store address behind the UK fetch address, the store address increasingly lags the fetch address as processing continues, since each stored CK is shorter than the fetched UK it replaces.

Each CK is followed by a set of pointer bytes, which (except the last) is immediately followed by a P byte beginning the next CK. Other than being sequenced, there are no predetermined locations for the CK's, as there are for the UK's (due to the values in the MUKL and RL bytes).

Each like-ordered pair of bytes in the current (*i*) UK and next (I+1) UK are compared by a byte Comparator 125 in FIG. 8A. Comparator 125 determines the equality or nonequality of the UK bytes in the A1 Byte register and the A2 Byte register. The current bytes being compared are fetched from buffer 10 to registers A1 and A2 from like byte positions in the *i* and *i*+1 UK's. The like position of these bytes in the compared UK's is indicated by a UK Byte Counter 116 in FIG. 7.

The circuits in FIG. 8B decide the timing which chooses the P counter state and the A2 bytes which will become CK bytes. The following Legend For FIG. 8B will assist an understanding of its operation:

LEGEND FOR FIGURE 8B

| Lead name | Indicating function when activated |
|---|---|
| Gate K–1 | Equal A2 between $P_{i-1}$ and $P_i$ of $i+1$ UK (gate K from $P_{i-1}$ to $P_i$). |
| Gate K–3 | Unequal A2 byte at $P_i \geq P_{i-1}$ (gate K at $P_i \geq P_{i-1}$). |
| Gate P–1 | Gate P counter to buffer as $P_i \geq P_{i-1}$ (gate $P_i \geq P_{i-1}$). |
| Gate K–2 | Unequal A2 byte at $P_i < P_{i-1}$ (gate K at $P_i < P_{i-1}$). |
| Gate P–2 | Gate P counter to Buffer Input bus as $P_i < P_{i-1}$ (gate $P_i < P_{i-1}$). |
| State C | Scan through UK bytes after $P_i$ position (noise bytes). |
| Finish C | End of each UK scan up to $P_i$ of next UK scan (redundant equal bytes). |
| State E | $P_i < P_{i-1}$ signal. |
| State F | Equal A2 byte at $P_{i-1}$ for current UK scan. |
| Not State F | First UK scan, or later scan with $P_i < P_{i-1}$ or later scan not at $P_{i-1}$ position with $P_i > P_{i-1}$. |
| Reset State C | UK count$=P_{i-1}+1$. |
| Run P Counter | While each K byte is being extracted from the $i+1$ UK. |
| Stop P Counter | While no K byte is being extracted. |

The P Counter in FIG. 8A is initially reset to zero by the 1P Cycle. The $P_i$ value is registered in the P counter in two different ways depending on whether $P_i \geq P_{i-1}$ or $P_i < P_{i-1}$. The latter condition is indicated by a State $\bar{E}$ signal from FIG. 8B to gate 136 in FIG. 8A, which causes the UK counter value to be registered in the P counter at the first unequal A2 byte at a position less than $P_{i-1}$. If $P_i \geq P_{i-1}$, this condition is indicated by a "Run P Counter" signal from FIG. 8B. It causes P counter to be stepped by gate 135 at each T2 pulse after the $P_{i+1}$ value is reached, as long as equality of UK bytes exists, and the P counter stops at the first unequal UK bytes, which is at the $P_i$ value. At the beginning of any UK comparison, the $P_i$ value contained in Counter P becomes the $P_{i11}$ value for the next UK comparison. After the $P_i$ value is set during any UK comparison the P counter is not disturbed during the remainder of that UK comparison, nor during the following comparison until the first occurring of the $P_i$ or $P_{i11}$ position is reached by the UK Byte counter.

Before the $P_{i11}$ position is reached during any UK comparison, the value in UK counter 116 in FIG. 7 is compared to the $P_{i11}$ count in the P counter in FIG. 8A by a Comparator 132 in FIG. 8A. Due to the particular implementation of the P counter in this embodiment, the $P_i$ and $P_{i11}$ values cannot be determined by Comparator 132 alone. The comparative relationship between $P_i$ and $P_{i11}$, as implemented, requires the circuitry in FIG. 8B.

The condition $P_i<P_{i11}$ is sensed by gate 144a in FIG. 8B and is indicated by setting trigger 144b to provide a State E signal. The P counter is set with this $P_i$ (via gates 134 and 136) by the then existing UK Byte count existing upon the occurrence of the State E signal. Thereafter $P_i$ remains in the P counter, and comparator 132 remains static for the remainder of the scan of that UK pair.

The condition $P_i \geq P_{i-1}$ during UK byte equality is sensed by gate 146a and the setting of trigger 147a in FIG. 8B to provide a State F signal. That is, it senses when UK byte equality exists and that the next pair of bytes be compared for equality. Gate 147b signals the timing when the UK Byte counter contains the $P_{i11}+1$ value. If UK byte equality continues at $P_{i11}+1$, it is the first K byte position in a plural byte CK The last K and its $P_i$ position in any plural byte CK are indicated by signals K—3 and P—1 from gates 140a and 140b in FIG. 8B to indicate the first unequal byte position following the $P_{i11}$ position in the current UK comparison. A trigger 141b is set by the K—3 signal to provide a "State C" signal which exists while the remaining part of the current UK pair is being scanned by the UK counter in FIG. 7. Gates 140a and 140b indicate a K byte at a $P_i \geq P_{i-1}$ operated in this embodiment.

The incrementing of the P counter is stopped when gate 140b senses the first unequal UK byte position with a Gate P—1 signal that sets trigger 141b to provide the "Stop P counter" signal and drop the "Run P counter" signal. During this same A2 cycle, gate 140a signals the transfer of the A2 byte as the last (and perhaps only K byte of the current CK, while gate 140b signals the transfer of the corresponding P byte. The P counter is left with the value $P_i$ for the remainder of that UK comparison, and it becomes $P_{i11}$ for the generation of the next CK.

The final UK scan occurs during State C. The scanning continues as the UK Byte Counter continues to be incremented at T1 during each A1 cycle via AND-gate 106 in FIG. 7, even though the P counter is static with the $P_i$ value. Hence the UK count no longer is equal to the P count after the $P_i$ position. This incrementing by the UK Byte Counter continues until the A2 cycling is ended by comparator 114 in FIG. 7. It provides a UK End signal to AND-gate 142 in FIG. 8B, which sets a trigger 142a to provide a "Finished C" signal that indicates the UK scan is finished.

Every byte of each $i$+1 UK in any comparison is transferred to A2 Register 124 in FIG. 8A through gate 123. Only selected CK bytes are, however, permitted to transfer from the A2 register to the CK field in Buffer 10 through a gate 128b. The circuit in FIG. 8B decides which A2 bytes in A2 register 124 are to be transferred by gate 128b as K bytes for the current CK field. A gate 128b in FIG. 8A executes these timing decisions from FIG. 8B which are collectively received by an OR Circuit 130 in FIG. 8A. It selectively enables gate 128b to transfer each selected A2 byte to Buffer 10 as part of the current CK.

The circuit in FIG. 8C controls the store addresses to Buffer 10, under control of a Store Address Counter 156, which is initially set to the first K byte address (displacement 4) for the first CK. It is incremented as required to the displacement address for the respective bytes to be stored. An OR Circuit 159 controls address stepping for K and R bytes. Gate signals K—1, K—2 and K—3 from FIG. 8B are each applied to OR circuit 159, as well as each R cycle via AND 160, to step counter 156 via OR circuit 158 and to set control trigger 161. Trigger 161 accommodates the different timings of signals from OR 159, which occur before T6 during a K or R cycle when an AND 162 is enabled to actuate output gate 157 to provide an address to Buffer Address Bus 16 via OR circuit 153. Trigger 161 is reset by the next following T0 pulse.

The $P_i$ value is transferred to the addressed $P_i$ location in Buffer 10 from the P counter via $P_i$ gate 129, OR circuit 131 and bus 13 in FIG. 8A. The transfer is timed by OR circuit 133which receives the Gate P—1 and Gate P—2 signals from FIG. 8B or a special end of record signal from AND circuit 133a.

Register 124 in FIG. 8A can handle the R bytes as well as the A2 bytes without conflict, since they occur at different times as previously explained for the occurrence of A2 and R clocking cycles from FIG. 6.

The R Cycles on gate 123 in FIG. 8A transfer the pointer bytes sequentially to Byte Register 124. Similarly gate 128b can control selection of either the A2 or R bytes without conflict, since they occur at different times. The pointer bytes are transferred sequentially by each R cycle at T5 on AND circuit 127 which actuates gate 128b. The pointer bytes are buffered by Register 124 to permit them to be stored back into Buffer 10 at a different address than from where they were fetched, as respectively indicated by Fetch Address Counter 110 in FIG. 7 and store address counter 156 in FIG. 8C. Both counters are synchronously stepped by each R cycle. This is done by AND-gate 100 in FIG. 7, and by OR circuit 159, AND circuit 160, and OR circuit 158 in FIG. 8C.

The last R byte during a pointer transfer is signalled by a comparator 189 in FIG. 8D when the RL count is reached for the R cycles. The normal stepping of Store Address Counter 156 likewise occurs during the last R cycle to step the Store Address Counter to the P byte address of the next CK.

This P byte address is stored in a "Next P Address" Register 150, since the detection of the next $P_i$ by Gate P—1 can occur after the storing of one or more K bytes. The $P_i$ address is stored in Register 150 during the last R byte, by Stepping Store Address Counter 156 with the R End Reserve signal next in anticipation of the next P byte for the new CK.

To control this $P_i$ and first K addressing operation in FIG. 8C, a signal is generated during the last R byte of each pointer. The signal (R End Reserve) copies the next $P_i$ store address via a gate 152 into the "Next $P_i$ Address" Register 150 from where the next $P_i$ address is available, while the Store Address Counter is stepped to the next higher address, which is the value finally contained in Register 150.

The equal on RL signal for each pointer changes the clocking cycles from R cycles to A1 and A2 cycles to initiate a comparison for the next UK pair in the manner previously explained resulting in the generation of the next CK.

This operation repeats for each subsequent UK pair until all UK pairs in Buffer 10 are processed.

The end of the UK record in Buffer 10 is sensed when the first (and last) A2 cycle transfers the "End of Record" byte to the A2 byte Register. Each A2 byte is sensed by an "End Byte Decoder" 180 in FIG. 8D and an AND circuit 180a, which sets a trigger 181 to indicate an End of Record signal to FIG. 6.

The last CK is generated in response to the End of Record signal. The last CK has a zero $P_i$ value, no K bytes, and the pointer field associated with the last UK. The P counter is reset to zero value by an End of Record signal from trigger 181 in FIG. 8D; and the UK Byte Counter was reset to zero by the prior R cycles.

The final A2 cycle increments the UK counter to one via gate 106 in FIG. 7, which makes the UK count greater than the P count. This condition prevents any actuation of the circuit in FIG. 8B. The P counter remains at zero because no Run P counter signal is being provided to gate 135 in FIG. 8A. The address stored in Register 150 in FIG. 8C is gated out during the last A2 cycle by the End of Record signal applied to AND circuit 151c via OR 151a and Latch 151d. The zero $P_i$ value in the P counter is transferred through the $P_i$ gate 129 to the Buffer Input Bus 13 by means of AND circuit 133a which is activated by the last A2 cycle and the End of Record Signal at T6 time via OR circuit 133b.

In FIG. 6, the End of Record Signal replaces the UK End signal through OR circuit 33b to initiate R cycling (and end A1 and A2 cycling), which begins the transfer of the R field in the manner previously explained.

At the end of the last pointer field transfer, the Clock cycling is ended by a General Reset signal from Single Shot 185 which is actuated by a gate 183 in FIG. 8D, Gate 183 is enabled by the EQU on RL signal during the existence of the End of Record signal.

4. Specific - Output

The detailed operation of the Generation mode embodiment shown herein is represented by the following sequence:

I. Start Signal to FIG. 6 causes flag cycles and initializing of system before fetching first UK byte by:

a. setting "Next P Address Register" to "1P Byte" address (Byte=3).

b. setting "Store Address Counter" in preparation for the first K address (Byte=3).

c. setting "P Counter" and "UK Counter" to zero before first UK is fetched.

d. all triggers in FIG. 8B are reset with only active signals being "Not State F" signal and "Run P Counter" signal.

Begin A1–A2 clock cycling in FIG. 6.

II.

At T1 time, UK Byte counter incremented by 1 in FIG. 7.

At T2 time, P counter incremented to 1 in FIG. 8A.

At T3 time, if A1=A2, go to III, but if A1≠A2 go to IV. cycle T0 AND-gate

III.

At T3, gate K–1 in FIG. 8B, since UK counter = P counter, and go to II.

IV.

At T3, gate K–3 in FIG. 8B, since UK counter = P counter.

Turn on "State C" in FIG. 8B.

At T4, gate P–1 in FIG. 8B.

Turn on "Stop P counter" and turn off "Run P counter" in FIG. 8B, and go to V.

V.

Step UK Byte counter by 1 in FIG. 7 (P counter is now inhibited with $P_i$; hence UK counter ≠ P counter).

As long as UK counter ≠ MUKL Register (i.e. no "UK End" signal), go to V.

When UK counter = MUKL Register (i.e. "UK End" signal), go to VI.

VI.

Turn on "Finish C" signal in FIG. 8B.

Turn off "State C" signal in FIG. 8B.

Begin R cycling in FIG. 6 for transferring pointer bytes from *i* UK to *i* CK.

Completion of R byte transfer indicated by "R End Step" signal in FIG. 8D.

Go to VII.

VII.

Begin A1 and A2 clock cycling in FIG. 6 for next UK pair.

($P_i$ value in P counter now reassigned as $P_{i11}$ value.)

At T1, UK Byte counter incremented by 1.

If first A2 byte is decoded as End of Record in FIG. 8D, go to XIII.

If first A2 byte is not an End of Record indicator, go to VIII.

VIII.

If Uk Byte counter < P counter, and A1≠A2 in FIG. 8B, go to IX, else go to X.

IX.

At T3, Set "State E" signal in FIG. 8B.

At T4, gate UK Byte counter into P counter in FIG. 8A to obtain new $P_i$.

At T5, activate Gate K–2 in FIG. 8B to transfer A2 byte in FIG. 8A as K byte to Buffer Input Bus, In FIG. 8B, turn on "State C," "Stop P counter" signals, and Reset "Finish C" signal.

At T6, activate Gate P–2 in FIG. 8B to transfer $P_i$ value in P counter in FIG. 8A to Buffer Input Bus, Turn on "Stop P counter" in FIG. 8B.

Go to V.

X.

If UK Byte counter = P counter, and A1=A2 (gate 146a), go to XI. else go to XII.

XI.

At T2, turn on "State F" signal in FIG. 8B,

At T7, generate "Reset State C" signal.

Reset "State C" latch.

Reset "Finish C" latch.

Set "Run P counter."

Go to II.

XII.

If both VIII and X are not true, then go to VIII.

XIII.

Reset P counter to zero in FIG. 8A.

(Conditions exist which cause FIG. 8B signals to remain at initialized states.)

Begin R cycles in FIG. 6, and transfer last pointer field.

General reset from FIG. 8D upon completion of R byte transfer to end operation.

SEARCH MODE SYSTEM

The basic search mode system was previously described herein. Accordingly one among the numerous conceivable embodiments of this invention is next described.

1. Search Mode Circuits

The input from the Data Output Bus to FIG. 12 is a compressed index which may be provided from any of a number of sources. Two alternative general sources are assumed for this embodiment. One is a word random access device such as core memory 10, and the other is a serial type of Input/Output (I/0) device such as disk, drum or tape.

FIG. 10 shows a circuit for connecting such alternative devices as an I/O device or a memory buffer. An Input Select Trigger 305 is actuated by execution of a conventional type of computer select instruction of the type previously explained, such as an I/O Select instruction. The instruction may have two modes, which are an I/O Mode and a Buffer mode. The I/O mode sets a Select trigger 301 in FIG. 10 and the Buffer mode resets this trigger. When set, it connects I/O Device 300 to the Data Output Bus via Gate 302 and OR Circuit 304. When reset, trigger 301 connects the Buffer Output Bus 14 (from Buffer 10 in FIG. 2B) to the Data Output Bus via a Gate 303 and OR Circuit 304.

The Search Mode uses the clocking control circuit shown in FIGS. 9A and B, which provides the same flag cycles as the Generate Mode clocking control in FIG. 6. Likewise in FIG. 9A, the MUKL Cycle is used primarily for initial reset purposes, but the MUKL byte not transferred in this Search Mode embodiment. FIG. 4B illustrates the timing for the Clock Control Circuit in FIGS. 9A and B. During LVL cycle time and T1, the next input byte (LVL) is gated to the LVL register 268 in FIG. 12. The outputs of the LVL register define whether the compressed index record being handled has the high or low level format.

At RL cycle time and TL time, the next input byte is gated to the RL register. The RL register defines the length of each pointer field following any CK.

A P cycle follows the RL cycle. At T0 time during each P cycle, a $P_i$ register 308 in FIG. 13 is reset to an initial condition of zero. At T1 during the P cycle, the P byte of a CK is sent from the input device to a $P_i$ register 308 in FIG. 13 at T1 time via gate 307. Register $P_{i11}$ was initially reset to +1 by the MUKL cycle. The outputs of $P_i$ register 308 and the $P_{i11}$ Counter 314 are provided to Comparator 316 to compare $P_i$ value (initially one or greater) to $P_{i11}$ (initially one). Later if $P_i$ is less than $P_{i11}$ latch 319 is turned on.

Figure 9B:
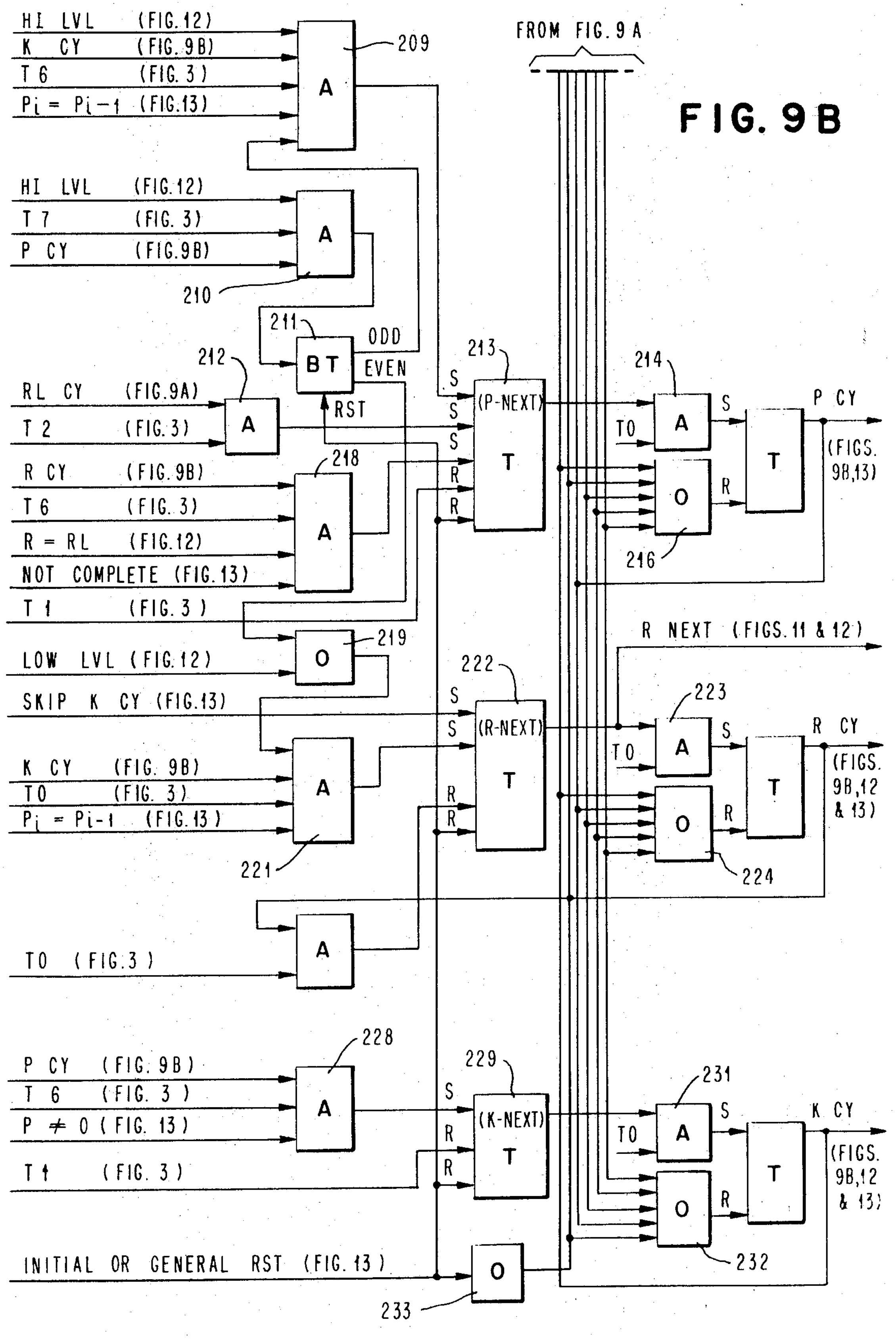

The Clock Control Circuit in FIG. 9B provides one or more K cycles following each single P cycle. During each K cycle, a K byte (which is the next byte from the input device) is gated to T1 time into K register 256 in FIG. 12. The K register is always reset to zero during each K cycle at T0 time via AND-gate 257, and is set at T1 via gate 254 to the received K byte value.

An Equal Counter 301 (FIG. 13) aids the efficiency of operation by permitting each byte of the search argument to be examined no more than once per compressed index sequence. This permits the high-order equal bytes of the compared UK's to be dropped during the Generate Mode.

If at K cycle time, the $P_{i11}$ counter is equal to the Equal Counter 301 in FIG. 13, a Search Argument byte (A) is gated into the search argument register 252 in FIG. 12. If the search argument byte (A) is greater than the K byte (in K Register), the A byte remains in the Argument Register while the first K byte of the next CK is gated into the K register for a next comparison. If the A byte is less than the K byte, the search ends; and the R bytes associated with the CK are retrieved and placed in the Pointer Found register in FIG. 2B, into which the pointer with the first high CK is placed (ascending sort assumed for original UK's).

The initial condition of Equal Counter 301 in FIG. 13 is a value of one, set during the MUKL cycle at T0 via AND Circuit 302. Thus the first comparison between the values in $P_{i11}$ Counter 314 and Equal Counter 301 will be equal, and this equality is indicated by an output from a Comparator 303. Each equality between Counters 314 and 301 sets an Equality Latch 306 during a K cycle at T2 time. Latch 306 is reset shortly thereafter at time T4 so that a S.A. Equality pulse is signaled during T2–T4.

If Comparator 253 in FIG. 12 signals that K is equal to A, and Equality Latch 306 is set, then Equal Counter 301 is incremented by one by the Equality Pulse via AND-gate 326 and OR circuit 324.

During the next K cycle time, a new K byte is gated into K register 256 in FIG. 12 from the Data Output Bus. Again a test is made by Comparator 303 in FIG. 13 to see if $P_{i11}$ Counter 314 is equal to Equal Counter 301. If they are equal, then the next Search Argument byte is fetched and another comparison made. The Equality Counter 301 is not set if the K byte is greater than the A byte; but instead, an A High Latch 328 is set via AND-gate 327 which conditions an AND-gate 329, that ends the search operation for this Search Argument, after retrieving the pointer with the current CK by setting a Search Complete Latch 331.

In FIG. 13, during every K cycle at T3 time, $P_{i11}$ counter 314 is incremented by one. When $P_i$ is equal to $P_{i11}$ during a K cycle at T0 time, the R Cycle Next latch is turned on in FIG. 9B. The next cycle will be an R cycle. During the R cycles, the pointer bytes from the input device are gated to Register 256 in FIG. 12 by gate 254 being actuated by R cycles through OR circuit 255. The Pointer bytes are outputted to the Buffer Input Bus 13 via a Gate 265 when it is activated by AND circuit 260 in response to an R Select signal.

A comparison is made between the RL register 259 and the R counter 264 to determine when the two are equal. When they are equal, the End of the Pointer is indicated by an R=RL signal. Then the P cycle next latch is turned on and the next cycle from FIG. 9B is a P cycle.

During the P cycle, the $P_i$ Register in FIG. 13 is reset to zero at time T0, and is set at T1 by gate 307 to the new $P_i$ byte then existing on the Data Output Bus from the input device. A K cycle follows each P cycle and causes the K register to be loaded at T1 time with the next byte from the input device.

During every P cycle, a test is made by a Comparator 316 to determine if the $P_i$ Register value is less than the value in $P_{i11}$ Register. If $P_i$ is less than $P_{i11}$, and the $P_i$ value is not equal to zero (as determined by AND-gate 317), the contents of the $P_i$ are copied via gate 313 into the $P_{i11}$ counter to provide a new value representing $P_i$ at this time.

However if comparator 316 indicates $P_i$ is greater than $P_{i11}$, the $P_i$ remaining from the prior CK becomes the $P_{i11}$ and is directly used. In this case during each immediately following K cycle, the $P_{i11}$ counter is incremented by one via AND circuit 321 to represent the next byte; and the incremented $P_{i11}$ counter value is compared with the $P_i$ Register value by means of comparator 316. Also the incremented $P_{i11}$ counter value is compared with the Equal Counter value by means of comparator 303.

It is important to understand that a true $P_{i11}$ value is only represented in the $P_{i11}$ Counter 314 before it is incremented during a new CK operation. Once it is incremented, the $P_{i11}$ counter value is higher than the current $P_{i11}$ value. Each incremented $P_{i11}$ counter value represents the actual UK position for the current K byte in the UK represented by the current CK.

Only when it is determined that the incremented $P_{i11}$ counter value is equal to the Equal Counter value can the next byte of the search argument be obtained from buffer 10 and loaded into the Argument Register 252.

The Equal Counter is incremented by one by a "+1 to Equal Counter" signal from AND circuit 326, which is actuated at T3 time during a K cycle whenever the current K byte equals the current argument byte A and an "S.A. Equality" signal is being received from trigger 306. The 37 S.A. Equality" signal is provided between T2–T4 after an "S.A. Count = $P_{i11}$" signal from comparator 303 at T2 time during a K cycle.

Upon the occurrence of incrementing the S.A. Equal counter, the next argument byte is not gated into the Search Argument Register 252 until the next K cycle. After loading the Search Argument Register triggers 242 and 243 are turned on to inhibit access of the next Search Argument until that time that another +1 to EQU CTR signal is generated.

The same search argument byte is used to sequentially scan the CK's, until the argument byte is equal to the K byte at the same relative position in the uncompressed key (represented by the incremented value in $P_{i11}$ counter 314) as is the relative position in the search argument of the current argument byte (represented by the value in Equal Counter 301).

The search is complete during the scanning of CK's under three conditions: (1) a current argument byte A is higher than a K byte in the entire CK index, i.e. the P byte is decoded as a 0 by the all Zero Detector 309, or (2) a $P_i$ is less than the current Equal Counter setting, or (3) the $P_{i11}$ counter value is equal to the Equal Counter value, and the argument byte A is less than K. The third condition is indicated by the output from AND Circuit 327 which sets a trigger 328. The second condition is indicated by an AND circuit 315 in FIG. 13 which is actuated by a signal from comparator 303 that indicates $P_i$ is less than the current Equal Counter setting at T2 time during a K cycle. The first condition is obvious where the search argument is higher than any key and it is caused by an output from AND 332 setting trigger 328.

Figure 2B:
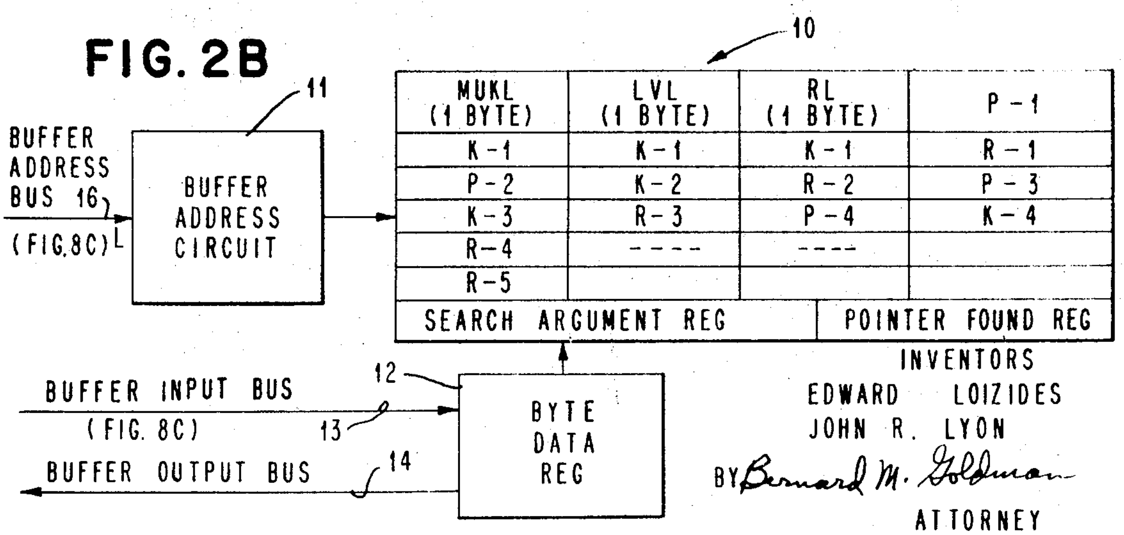

Trigger 328 remains set to activate an R Select signal while the current pointer following the last CK is fetched and stored in the Pointer Found Register field in Buffer 10 in FIG. 2B.

The end of the pointer transfer is indicated by an R=RL signal to AND circuit 334 which sets a Search Complete trigger 331 via AND 329 which is being conditioned by trigger 328 or Trigger 333. Trigger 331 conditions an AND circuit 336 to generate a General Reset Pulse at the next T6 time which resets triggers 328 and 333, the clock cycling circuit in FIGS. 9A and B, and ends the Search Mode operation.

If the Argument is not found in the compressed index, a $P_i$ value of zero is finally sensed by All Zero Detector 309 in FIG. 13. This causes AND 332 to be activated during the last P cycle, and it sets trigger 333 which then provides a Skip K Cycle signal to the Clock Control Circuit in FIG. 9B to force it to begin R cycles for posting the last pointer into the Pointer Found Register in FIG. 2B. Also trigger 333 provides an output through OR circuit 333 to AND 329 in order to set the Search Complete trigger 331 when the last pointer is registered.

Hence, the Search Complete signal in FIG. 13 indicates that the entire pointer has been stored into the designated R register for the found pointer. The search operation is thus complete.

The last pointer may be used to fetch the last original uncompressed key to verify that the Search Argument was part of the original list of uncompressed keys. If not, the index may be updated then by inserting new UK's and regenerating the CK index.

The circuit in FIG. 11 determines the Buffer 10 location for the Pointer Found bytes, which are transferred by Register 256 in FIG. 12 to Buffer Input Bus 13 when the trigger 328 is set in FIG. 13. The addressing of the predetermined Pointer Found register in FIG. 2B is accomplished by Counter 156 in FIG. 11. The R Next signal from FIG. 9B sets Address Counter 156 to the starting byte address of the Pointer Found Register in Buffer 10 which may be any predetermined available location in Buffer 10. (The address counter may be the same Store Address Counter 156 used in Generate Mode.) An AND circuit 314 increments Counter 156 at T6 during each R cycle while the trigger 328 is set to generate each R byte in the Pointer Found Register field. The other input to Adder A provides an all zero input to the adder, since Gate 315 is not activated by any K cycles.

The Fetch Address Counter 110 may also be the same counter which was used during Generate Mode. Counter 110 is reset to zero in Search Mode by the MUKL cycle and is thereafter incremented by one at time by T7 by each succeeding cycle of the clock in FIG. 3. The Fetch address is outputted from Counter 110 at every clock time T0 to the Buffer Address Bus 16 via AND 312*a* and OR 312*b*. Hence the Fetch Address Counter sequentially scans a compressed index record.

The Search Argument bytes are also addressed by counter 156, which during each P cycle is set to the beginning of a predetermined search argument register address in buffer 10 in FIG. 2B. The current byte position in the search argument needed for a comparison is obtained from Equal Counter 301 in FIG. 13. It is provided to gate 315 in FIG. 11, which outputs it during each K cycle to Adder A, which adds the Equal Counter value to the initial Argument Address in Address Counter 156. The output of Adder A is provided through AND 313 an OR 312*b* at time T7 to the Buffer Address Bus 16 to fetch the argument byte needed for a comparison with the current K byte.

A search for the next Search Argument through the same compressed index may be commenced.

2. Clock Controls For Search Mode

FIGS. 9A and B show Search Clock Controls for providing the six types of cycles shown in FIG. 4B used for searching a Compressed Index. The Search Clock Controls for the initial flag bytes in FIG. 9A are similar to controls for the flag bytes of the Generate Clock Controls shown in FIG. 6.

One overall sequence is provided by the Search Clock Controls while searching a single compressed index block ending with a CK having a Zero P byte. The flag byte cycles (MUKL, LVL and RL) occur once per record search for a search argument. The P cycle occurs once during the P byte beginning each CK. A K Cycle occurs once per K byte in a CK. An R cycle occurs once per pointer byte associated with a CK.

The Clock Control operation is started by a Start signal on lead 205 in FIG. 9A. This Start signal is generated in the same manner as explained for the Start signal on lead 45 in FIG. 6, in which case a starting switch 210, or preferably a starting instruction, needs to distinguish between the Search mode for setting the mode trigger 20 in FIG. 3, and for actuating Single Shot 27 to generate the start signal to FIG. 9A.

The triggers and operation for these three flag cycles (MUKL, LVL and RL) in FIG. 9A are identical to the like-identified circuits in FIG. 6 previously described for the Generate Mode.

Thereafter the Search Clock Control circuits differ from the Generate Clock controls. This is primarily due to the variable length of the CK's in Search Mode, as opposed to the fixed length of the UK's in Generate Mode. The variable length conditions are handled in FIG. 9B by a next-cycle latch for signaling in advance when the next type of cycle is to be selected. Thus a P-Next latch 213 is set by a gate 212 at T1 time during the RL flag cycle, since a P cycle must follow the RL cycle. Also, a P cycle follows the last R cycle of each pointer scan, and this is indicated by the RL Equal signal to AND circuit 218, which sets latch 213 at T6 during the RL cycle. When set, the P-Next latch 213 conditions gate 214, which then sets the P Cycle Trigger at the next T0 time. Hence the P Cycle begins at the next T0 and the P-next latch is reset at the next T1 pulse.

The K-Next latch 229 is turned on by gate 228 at T6 during the P-Cycle when P is not zero (i.e. not the last CK). Gate 231 is thereby conditioned to pass the next T0 pulse, which sets the K Cycle latch to begin a K Cycle. The first K Cycle resets the P-Cycle latch via OR Circuit 216.

The K-Cycle latch remains on for the number (one or more) of K bytes in the current CK, wherein K cycles are sequentially provided until a $P_i = P_{i11}$ signal from Comparator 316 in FIG. 13 indicates that the $P_{i11}$ Counter 314 has become equal to the current $P_i$ value in register 308.

The $P_i = P_{i11}$ signal to AND circuit 221 causes the R-Next latch 222 to be set during each last K byte in Low Level record format. At the following T1 time, the K-Next latch is reset; and the R Cycle latch is set to begin a sequence of RL number of R cycles. The first R cycle resets the K Cycle latch via OR circuit 232. The R Cycles continue until the R Count equals the RL value in Register 259 in FIG. 12, which is signaled by output RL CT from comparator 261 in FIG. 12 to gate 218 in FIG. 9B. This sets the P-Next Trigger at T6, and the process repeats for each next CK during Low Level operation until a zero P byte is sensed, which indicates an end of the CK group. It causes a Skip K Cycle signal to be generated from trigger 333 in FIG. 13, which sets the R-Next trigger 222 in FIG. 9B to cause R Cycles next and thereby skip the K Cycles for the last CK. This ends the Clock Control operation in Low Level compress index mode.

The operation for High Level is similar except that a second set of P and K cycles follow each first set of P and K cycles before R cycles are generated, as represented by the sequence in FIG. 5B. This is controlled by a Binary Trigger 211 which is initially reset and is actuated to a reverse state by each succeeding P cycle.

Hence after odd-numbered CK's, the Binary trigger 211 conditions an AND circuit 209 to set the P-Next trigger 213 at the end of the last K cycle of the last CK, which causes a P cycle (instead of an R cycle) to follow each odd-numbered CK. The even-numbered CK signals from trigger 211 condition AND circuit 221 via OR circuit 219 to set the R-Next Cycle Latch.

To avoid any search ambiguity, the lowest-order byte of the Search Argument should be followed by a special byte which is lower than any possible K byte in the index. The lowest character in the used collating sequence can be used as this special byte. Thus if all search argument bytes compare-equal during a search, this special byte will force an $A<K$ on the next $K$ byte to end the search at the current CK, with its pointer being read to indicate the exit point for this Search Argument.

What we claim is:

1. In a method for generating a compressed key from a sequence of sorted uncompressed keys comprising a source index, including the steps of machine-accessing a byte from any uncompressed key and a byte from its immediately following uncompressed key in said source index, the bytes being a pair of the same order sequentially beginning from the highest-order byte position of both said uncompressed keys, machine-comparing each said pair of bytes beginning at the highest-order position to generate an unequal signal when any said pair is unequal, machine-counting each of said byte-positions from the highest-order position, and stopping said machine-counting step in response to said unequal signal to register a particular stopped count, and registering a byte from said immediately following uncompressed key at its position represented by said particular stopped count in relation to its highest-order byte, said byte being a key byte for said compressed key, whereby every compressed key generated by the use of said machine-comparing step has at least one key byte.

2. In a method for generating a compressed key as defined in claim 1, further including the steps of machine-recording said particular stopped count as a control field for said particular compressed key, and also machine-recording said particular stopped count with said key byte to represent its position as the unequal byte found by said machine-comparing step, whereby every compressed key generated with the use of said machine-comparing step includes a particular stopped count as a control field.

3. In a method for generating compressed keys as defined in claim 1, further comprising the steps of machine-accessing a next uncompressed key in said source index, said immediately following uncompressed key and a next uncompressed key comprising a current pair of uncompressed keys, repeating said machine-comparing step by comparing like-ordered bytes in said current pair beginning at their highest-ordered byte position, machine-counting the like-ordered byte positions from the highest-ordered position as they are being compared by said machine-comparing step, and stopping said machine-counting step in response to said machine-comparing step sensing the first unequal pair of bytes to register a current count of said machine-counting step as a particular stopped count, comparing said current count with a prior particular stopped count, and signalling if the former is less than the latter, and registering said current count, and a byte from said next uncompressed key at its position located by said current count in relation to its highest-order byte position, whereby a compressed key results from operation of said registration step.

4. In a method of generating compressed keys as defined in claim 3 in which said signalling step indicates said current count is greater than said prior particular stopped count, further including the step of said registering step inserting bytes into a compressed key from said next uncompressed key from a byte position located by said prior particular stopped count through its byte position located by said current count.

5. In a method for generating compressed keys as defined in claim 4, further comprising the step of machine-recording in a corresponding compressed key said current count and each of said key bytes inserted by the last operation of said registering step in the order they are found in said next uncompressed key, whereby said current count represents the position in said next uncompressed key of the lowest-order key byte in said corresponding compressed key.

6. In a method for generating compressed keys as defined in claim 3 in which said machine-recording step comprises recording each key byte after said control field.

7. In a method for generating compressed keys as defined in claim 3 including the steps of machine indicating an end-of-block signal while generating compressed keys, said next uncompressed key being the last uncompressed key used in the generation of a current block of compressed keys, machine-generating a special code to represent the control field of a last compressed key for the current block of keys being generated, and machine-accessing an address representing the location of information represented by said next uncompressed key, and machine-recording said special code and said address to represent the last compressed key for said current block, whereby said address is recorded as a pointer field with said last compressed key in said current block.

8. In a method for generating compressed keys as defined in claim 2 further comprising the steps of machine-accessing an address representing the location of information represented by said any uncompressed key, and machine-recording said address, as a pointer, next to each compressed key to provide a compressed key entry in a compressed index.

9. In a method for generating compressed keys from a sorted sequence of uncompressed keys providing a source index, including the steps of machine-accessing the uncompressed keys in pairs starting at the beginning of the sorted sequence, with a last uncompressed key of one pair becoming the first uncompressed key of a next pair, machine-comparing the corresponding bytes of each pair to generate an unequal-byte signal representing the highest-order unequal byte position in said pair, and machine-recording a compressed key comprising at least a position field in response to said unequal byte signal, and a byte from a second uncompressed key in each pair at the position at which said unequal-byte signal is generated, whereby the compressed key represents the first uncompressed key in each pair from which it is 10. In a method for generating compressed keys as defined in claim 9, in which said machine-comparing step further includes the steps of repeating said machine-comparing step to compare a next pair of uncompressed keys in said sequence to generate therefrom a next unequal-byte signal representing their highest-order unequal byte position, comparing said next unequal byte signal with a prior unequal-byte signal to generate a control signal indicating if said next unequal-byte signal is greater than said prior unequal-byte signal, and repeating said machine-recording step to record a next compressed key comprising at least a control field representing said next unequal-byte signal, and a byte from the second uncompressed key of said next pair at the position represented by said next unequal-byte signal, whereby said next compressed key represents the first uncompressed key in said next pair of uncompressed keys.

11. In a method of searching an ascending sorted index of machine-readable compressed keys representing different items of information, each compressed key having a control field representing the highest-order unequal byte position in an uncompressed key pair from which said compressed key was derived, including the steps of machine-reading a particular control field of any particular compressed key and a next control field of a next compressed key, and machine-relating said particular control field and said next control field to generate a factor signal indicating if said next control field is greater than, equal to, or less than said particular control field.

12. In a method of searching as defined in claim 11, including the step of machine-generating a factor field equal to said next control field in response to said factor signal indicating said next control field is less than said particular control field, whereby the factor field indicates the number of bytes missing from said compressed key and having a higher order than a highest-order key byte in said compressed key.

13. In a method of searching as defined in claim 11, including the steps of machine-generating a factor field equal to said particular control field in response to said factor signal indicating said next control field is greater than said particular control field.

14. In a method of searching as defined in claim 11, including the step of machine-generating a factor field equal to said particular control field or to said next control field in response to said factor signal indicating said next control field is equal to said particular control field.

15. In a method of searching for a search argument as defined in claim 13, including the step of setting a pointer-cycle storage element in response to a key byte comparing-high with a corresponding byte of the search argument, and machine-registering a pointer following said next compressed key in response to said pointer-cycle storage element being set to end the search in said index.

16. In a method of searching as defined in claim 11, including the steps of said machine-relating step generating a factor value for said next compressed key in response to said factor signal reacting with said particular and next control fields, and setting the factor value in a register, machine-accessing a key byte from said next compressed key, and a byte of a search-argument at a position indicated by the factor value in said register, machine-comparing said key byte and said byte of said search argument to generate a search signal representing if said key byte is less than, greater than, or equal to said byte of said search argument, machine-setting a found element in response to said search signal representing said key byte is greater than said byte of said search argument, and signalling the ending said search of said index for said search argument in response to said found element being set.

17. In a method of searching as defined in claim 11, including the steps of said machine-relating step generating a factor value for said next compressed key, said factor value being obtained from said particular control field if said factor signal indicates said current control field is less than said particular control field, but said factor value being obtained from said next control field if said factor signal indicates said current control field is equal to or greater than said particular control field, setting the factor value into a register, machine-comparing the value in said register with a setting of an equal counter, and generating an equal signal if said value is equal to said equal counter setting, machine-accessing a first key byte of said next compressed key and a first search-argument byte, next machine-comparing said first key byte and said first search argument byte to generate a search signal indicating if said key byte is less than, greater than, or equal to said search argument byte, incrementing said equal counter setting and the factor value in said register in response to said search signal indicating said key byte is equal to said search argument byte, and then machine-comparing the value in said register with said next control field, and generating a last-key-byte signal if they compare-equal, or a not-last-key-byte signal if they do not compare-equal.

18. In a method of searching for a search argument as defined in claim 17, including the steps of repeating said next machine-comparing step for each next search argument byte and each next key byte obtained by repeating said machine-accessing step as long as the search signal indicates an equal condition, and as long as said then machine-comparing step generates a not-last-key-byte signal, and incrementing the value in said register each time said search signal indicates an equal condition.

whereby said search is continued within the key bytes of said next compressed key.

19. In a method of searching for a search argument as defined in claim 17, including the steps of setting a pointer next storage element in response to said last-key-byte signal, and machine-reading a pointer following a last key byte of said next compressed key.

20. In a method of searching for a search argument as defined in claim 17, further comprising the steps of setting a control-field-cycle storage element in response to said search signal indicating a key byte is less than a search argument byte, and said machine-reading step reading a control field of a following compressed key in response to said control-field-cycle storage element being set, whereby the search of said index is continued.

21. In a method of searching for a search argument as defined in claim 17, including the steps of setting a key-byte-cycle storage element in response to completion by said reading step of reading a control-field, and machine-registering a key byte of said next compressed key in response to setting said key-byte-cycle storage element.

22. A system for generating a compressed key from a sequence of sorted uncompressed keys comprising a source index, comprising means for accessing a byte of from any uncompressed key and a byte from its immediately-following uncompressed key in said source index, the bytes being a pair of the same order sequentially beginning from the highest-order byte position of both said uncompressed keys, means for comparing each said pair of bytes beginning at the highest-order position to generate an unequal signal when any said pair is unequal, means for counting each of said byte-positions from the highest-order position, and stopping said counting means in response to said unequal signal to register a particular stopped count, and means for registering a byte from said immediately-following uncompressed key at its position represented by said particular stopped count in relation to its highest-order byte, said byte being a key byte for a compressed key representing the same information as is represented by said any uncompressed key, whereby every compressed key generated by the use of said comparing means has at least one key byte.

23. A system for generating a compressed key as defined in claim 22, further including means for recording said particular stopped count as a control field for said particular compressed key, and means for also recording said particular stopped count with said key byte to represent its position as the unequal byte found by said comparing means, whereby every compressed key generated with the use of said comparing means includes a particular stopped count as a control field.

24. A system for generating compressed keys as defined in claim 22, further comprising means for accessing a next uncompressed key in said source index, said immediately following uncompressed key and said next uncompressed key comprising a current pair of uncompressed keys, actuating said comparing means to compare like-ordered bytes in said current pair beginning at their highest-ordered byte position, means for counting the like-ordered byte positions from the highest-ordered position as they are being compared by said comparing means, and stopping the operation of said counting means in response to said comparing means sensing a first unequal pair of bytes to register a current count of said counting means as a particular stopped count, means for comparing said current count with a prior particular stopped count, and signalling if the former is less than the latter, and means for registering the current count, and a byte from said next uncompressed key at a position located by said current count in relation to its highest-order byte position, whereby a compressed key results from operation of said registration means.

25. A system for generating compressed keys as defined in claim 24 in which said signalling means indicates said current count is greater than said prior particular stopped count, further including means for registering bytes for a compressed key from said next uncompressed key from a byte position located by said prior particular stopped count through its byte position located by said current count.

26. A system for generating compressed keys as defined in claim 25, further comprising means for recording in a corresponding compressed key said current count and each of said key bytes inserted by the last operation of said registering means in the order they are found in said next uncompressed key, whereby said current count represents the position in said next uncompressed key of the lowest-order key byte in said corresponding compressed key.

27. A system for generating compressed keys as defined in claim 24 in which said recording means records each key byte after said control field.

28. A system for generating compressed keys as defined in claim 24 including means for indicating an end-of-block signal while generating compressed keys, said next uncompressed key being the last uncompressed key used in the generation of a block of compressed keys, means for generating a special code to represent the control field of a last compressed key for the current block of keys being generated, means for accessing an address representing the location of information represented by said next uncompressed key, and means for recording said special code and said address to represent the last compressed key for said current block, whereby said address is recorded as a pointer field with said last compressed key in said current block.

29. A system for generating compressed keys as defined in claim 23, further comprising means for accessing an address representing the location of information represented by said any uncompressed key, and means for recording said address, as a pointer, next to each compressed key to provide a compressed key entry in a compressed index.

30. A system for generating compressed keys from a sorted sequence of uncompressed keys providing a source index, including means for accessing the uncompressed keys in pairs starting at the beginning of the sorted sequence, with a last uncompressed key of one pair becoming the first uncompressed key of a next pair, means for comparing the corresponding bytes of each pair to generate an unequal-byte signal representing the highest-order unequal byte position in said pair, means for recording a compressed key comprising at least a position field in response to said unequal byte signal, and a byte from a second uncompressed key in each pair at the position at which said unequal-byte signal is generated, whereby the compressed key represents the first uncompressed key in each pair from which it is generated.

31. A system for generating compressed keys as defined in claim 30, in which said comparing means further includes means for actuating said comparing means to compare a next pair of uncompressed keys in said sequence to generate therefrom a next unequal-byte signal representing their highest-order unequal byte position, means for comparing said next unequal-byte signal with a prior unequal-byte signal to a control signal indicating if said next unequal-byte signal is greater than said prior unequal-byte signal, and means for actuating said recording means to record a next compressed key comprising at least a control field representing said next unequal-byte signal, and a byte from the second uncompressed key of said next pair at the position represented by said next unequal-byte signal, whereby said next compressed key represents the first uncompressed key in said next pair of uncompressed keys.

32. A system of searching an ascending sorted index of machine-readable compressed keys representing different items of information, each compressed key having a control field representing the highest-order unequal byte position in an uncompressed key pair from which said compressed key was derived, including means for reading a particular control field of any particular compressed key and a next control field of a next compressed key, and means for relating said particular control field and said next control field to generate a factor signal indicating if said next control field is greater than, equal to, or less than said particular control field.

33. A system of searching as defined in claim 32, including means for generating a factor field equal to said next control field in response to said factor signal indicating said next control field is less than said particular control field, whereby the factor field indicates the number of bytes missing from said compressed key and having a higher order than a highest-order key byte in said compressed key.

34. A system of searching as defined in claim 32, including means for generating a factor field equal to said particular control field in response to said factor signal indicating said next control field is greater than said particular control field.

35. A system of searching as defined in claim 32, including means for generating a factor field equal to said particular control field or to said next control field in response to said factor signal indicating said next control field is equal to said particular control field.

36. A system of searching for a search argument as defined in claim 31, including setting a pointer-cycle storage element in response to a key byte comparing-high with a corresponding byte of a search argument, means for registering a pointer following said next compressed key in response to said pointer-cycle storage element being set to end the search in said index.

37. A system of searching as defined in claim 32, including said machine-relating means generating a factor value for said next compressed key in response to said factor signal reacting with said particular and next control fields, and setting the factor value in a register, means for accessing a key byte from said next compressed key, and a byte of a search argument at a position indicated by the factor value in said register, means for comparing said key byte and said byte of said search argument to generate a search signal representing if said key byte is less than, greater than, or equal to said byte of said search argument, means for setting a found element in response to said search signal representing said key byte is greater than said byte of said search argument byte, and means for signalling the ending said search of said index for said search argument in response to said found element being set.

38. A system of searching as defined in claim 32, including means for activating said machine-relating means for generating a factor value for said compressed key, said factor value being obtained from said next control field if said factor signal indicates said next control field is less than said particular control field, but said factor value being obtained from said particular control field if said factor signal indicates said next control field is equal to or greater than said particular control field, setting the factor value into a register, means for comparing the value in said register with a setting of an equal counter, and generating an equal signal if said factor value is equal to said equal counter setting, means for accessing a first key byte of said next compressed key and a first search-argument byte, means for next comparing said first key byte and said first search argument byte to generate a search signal indicating if said key byte is less than, greater than, or equal to said search argument byte, means for incrementing said equal counter setting and the value in said register in response to said search signal indicating said key byte is equal to said search argument byte, and means for then comparing the value in said register with said next control field, and generating a last-key-byte signal if they compare-equal, or a not-last-key byte signal if they do not compare-equal to determine when the last key byte of said compressed key has been compared with a search argument byte.

39. A system of searching for a search argument as defined in claim 38, including means for repeating said next comparing step for each next search argument byte and each next key byte obtained by reactuation of said machine-accessing means as long as the search signal indicates an equal condition, and as long as said then comparing means generates a not-last-key-byte signal, and means for incrementing the value in said register each time said search signal indicates an equal condition, whereby said search is continued within a key byte field of said next compressed key.

40. A system of searching for a search argument as defined in claim 38, including means for setting a pointer next storage element in response to said last-key-byte signal, and said reading means reading a pointer following a last key byte of said next compressed key.

41. A system of searching for a search argument as defined in claim 38, further comprising means for setting a control-field-cycle storage element in response to said search signal indicating a key byte is less than a search argument byte, and means for activating said machine-reading means for reading a control field of a following compressed key in response to said control-field-cycle storage element being set, whereby the search of said index is continued.

42. A system of searching for a search argument as defined in claim 38, including means for setting a key-byte-cycle storage element in response to completion by said reading means of reading a control-field and means for registering a key byte of said next compressed key in response to setting said key-byte-cycle storage element.

PO-1050 (5/69)

100055

UNITED STATES PATENT OFFICE
CERTIFICATE OF CORRECTION

Patent No. 3,613,086 Dated October 12, 1971

Inventor(s) Edward Loizides, et al

It is certified that error appears in the above-identified patent and that said Letters Patent are hereby corrected as shown below:

In the Abstract, second column, line 12, after the word "provided" insert -- with each CK; and it is the pointer to the record --. Column 8, line 19, the word "sequence." should read --sequence.)--. Column 10, line 75, delete "T-" and insert --TO--. Column 12, line 36, delete "to" and insert --TO--. Column 15, line 53, delete "A1" and insert --A2--. Column 16, line 15, delete "133" and insert --133b--. Column 17, line 3, before the word "address" insert --$P_i$--; line 37, delete the word "cycle", line 38 delete "TO AND-gate". Column 20, line 4, delete "$P_{ill}$" and insert --$P_{i-1}$"; line 5, delete "$P_{ill}$" and insert --$P_{i-1}$--; line 7, delete "$P_{ill}$" and insert --$P_{i-1}$--; line 8, delete "$P_{ill}$" and insert --$P_{i-1}$--; line 10, delete "$P_{ill}$" and insert --$P_{i-1}$--; line 13 delete "$P_{ill}$" and insert --$P_{i-1}$--; line 14, delete "$P_{ill}$" and insert --$P_{i-1}$--; line 15 delete "$P_{ill}$" and insert --$P_{i-1}$--; line 16, delete "$P_{ill}$" and insert --$P_{i-1}$--; line 16, delete "$P_{ill}$" and insert --$P_{i-1}$--; line 17, delete "$P_{ill}$" and insert --$P_{i-1}$--; line 20, delete "$P_{ill}$" and insert --$P_{i-1}$--; line 29, delete "37" and insert --"29"--; line 30 delete "$P_{ill}$" and insert --$P_{i-1}$--; line 41, delete "$P_{ill}$" and insert --$P_{i-1}$--; line 48, delete "$P_{ill}$" and insert --$P_{i-1}$--. Column 22, line 23, delete "$P_{ill}$" and insert --$P_{i-1}$--; line 24, delete

PO-1050
(5/69)

UNITED STATES PATENT OFFICE
CERTIFICATE OF CORRECTION

Patent No. 3,613,086 Dated October 12, 1971

Inventor(s) Edward Loizides, et al

It is certified that error appears in the above-identified patent and that said Letters Patent are hereby corrected as shown below:

"$P_{ill}$" and insert --$P_{i-1}$--; line 26, delete "$P_i = P_{ill}$" and insert --$P_i=P_{i-1}$--. Column 24, line 32, after the word "is" insert --generated.--.

Column 29, line 27, after the word "said" insert --next--.

Signed and sealed this 27th day of June 1972.

(SEAL)
Attest:

EDWARD M.FLETCHER,JR.
Attesting Officer

ROBERT GOTTSCHALK
Commissioner of Patents